United States Patent
Andolina et al.

(10) Patent No.: US 12,443,419 B2
(45) Date of Patent: *Oct. 14, 2025

(54) ADJUSTING EMPHASIS OF USER INTERFACE ELEMENTS BASED ON USER ATTRIBUTES

(71) Applicant: salesforce.com, inc., San Francisco, CA (US)

(72) Inventors: Joseph Andolina, Castro Valley, CA (US); Owen Winne Schoppe, Orinda, CA (US); Brian J. Lonsdorf, Belmont, CA (US); Sönke Rohde, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 17/643,089

(22) Filed: Dec. 7, 2021

(65) Prior Publication Data
US 2022/0091862 A1 Mar. 24, 2022

Related U.S. Application Data

(63) Continuation of application No. 16/393,082, filed on Apr. 24, 2019, now Pat. No. 11,226,834.

(51) Int. Cl.
*G06F 9/451* (2018.01)
*G06F 3/0481* (2022.01)
(Continued)

(52) U.S. Cl.
CPC ............ *G06F 9/451* (2018.02); *G06F 3/0481* (2013.01); *G06F 16/285* (2019.01); *G06N 20/00* (2019.01)

(58) Field of Classification Search
CPC ........ G06F 9/451; G06F 3/0481; G06F 3/048; G06F 11/3438
See application file for complete search history.

(56) References Cited

U.S. PATENT DOCUMENTS

| 8,271,837 B2 | 9/2012 | Prophete et al. |
| 8,407,184 B2 | 3/2013 | Prophete et al. |

(Continued)

FOREIGN PATENT DOCUMENTS

WO 2020092308 A1 5/2020

OTHER PUBLICATIONS salesforce.com, inc., Get Started With User Interface API, TrailHead, 2018, 5 pages.

*Primary Examiner* — Nhat Huy T Nguyen
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed relating to emphasizing user interface elements for different users based on user attributes. In some embodiments, a system maintains a set of information (e.g., for a particular product) that includes multiple types of information. The system may access the same set of information for different user requests. The computing system may determine first and second subsets of the set of information based on attributes of the different users. The computing system may cause display of a first user interface on a device of the first user showing only the first subset of item fields for the two or more of the first set of items. The computing system may cause display of a second user interface on a device of the second user showing only the second subset of item fields for the two or more of the second set of items.

21 Claims, 22 Drawing Sheets

(51) Int. Cl.
*G06F 8/38* (2018.01)
*G06F 16/28* (2019.01)
*G06N 20/00* (2019.01)

(56) References Cited

U.S. PATENT DOCUMENTS

| | | |
|---|---|---|
| 8,490,050 B2 | 7/2013 | Crider et al. |
| 9,569,083 B2 | 2/2017 | Pimmel et al. |
| 9,575,998 B2 | 2/2017 | Shapiro et al. |
| 9,692,669 B2 | 6/2017 | Georgiev et al. |
| 9,703,517 B2 | 7/2017 | Andolina |
| 10,180,837 B2 | 1/2019 | Schoppe et al. |
| 10,440,435 B1 * | 10/2019 | Erdmann ............ H04N 21/4122 |
| 10,467,225 B2 | 11/2019 | Rohde |
| 10,481,792 B2 | 11/2019 | Bertoldo et al. |
| 10,628,445 B2 | 4/2020 | Prophete et al. |
| 10,642,468 B2 | 5/2020 | Guido et al. |
| 10,789,066 B1 | 9/2020 | Rohde et al. |
| 10,853,686 B2 | 12/2020 | Jain et al. |
| 2002/0078045 A1 * | 6/2002 | Dutta .................... G06F 16/951 |
| 2003/0126601 A1 | 7/2003 | Roberts et al. |
| 2005/0050031 A1 * | 3/2005 | Matsumoto ......... G06F 16/9535 |
| 2011/0246913 A1 | 10/2011 | Lydick et al. |
| 2011/0270628 A1 * | 11/2011 | Mital .................... G16H 40/67 |
| | | 705/347 |
| 2013/0132870 A1 | 5/2013 | Vishnubhatta et al. |
| 2014/0013247 A1 | 1/2014 | Beechuk et al. |
| 2014/0164923 A1 | 6/2014 | Georgiev et al. |
| 2014/0165001 A1 | 6/2014 | Shapiro et al. |
| 2014/0258013 A1 * | 9/2014 | Collins .............. G06Q 30/0255 |
| | | 705/26.3 |
| 2018/0067976 A1 | 3/2018 | Schoppe et al. |
| 2018/0349932 A1 | 12/2018 | Lee et al. |
| 2018/0365713 A1 | 12/2018 | Rohde et al. |
| 2019/0377543 A1 | 12/2019 | Lee et al. |
| 2020/0060445 A1 | 2/2020 | Andolina |
| 2020/0097577 A1 | 3/2020 | Nielsen et al. |
| 2020/0133444 A1 | 4/2020 | Hou et al. |
| 2020/0133692 A1 | 4/2020 | Rohde et al. |
| 2020/0133693 A1 | 4/2020 | Rohde et al. |
| 2020/0134310 A1 | 4/2020 | Rohde et al. |
| 2020/0341602 A1 | 10/2020 | Schoppe et al. |
| 2020/0341779 A1 | 10/2020 | Rohde et al. |
| 2020/0341780 A1 | 10/2020 | Andolina et al. |
| 2020/0341781 A1 | 10/2020 | Schoppe et al. |
| 2020/0387295 A1 | 12/2020 | Schoppe et al. |

* cited by examiner

User interface code
210

<div>
    <img src="...">
  <div>
    <a>John Doe</a>
    <a href="https://www.jd.com">link text</a>
  </div>
</div>

Elements

Displayed interface
220

Identified component
230

Image element 232

Label element 234

Link element 236

Elements may be grouped into components based on their coordinates, depth in the interface code hierarchy, and classification.

Fig. 2A

Store template information that defines a plurality of component types and one or more display parameters identified for one or more user interfaces, where a component type specifies a set of one or more user interface element types included in the component and a display parameter specifies how one or more components are to be displayed
510

Receive a request to automatically generate a user interface in accordance with the template information, wherein the request specifies data for a set of elements to be displayed in the user interface
520

Group ones of the set of elements into multiple components according to multiple ones of the component types
530

Format the components according to the display parameters
540

Cause display of a user interface that displays the components based on the formatting
550

Fig. 5

Generate one or more interaction metrics, where the generating is based on a first set of user input characteristics for user interaction with multiple different user interface formats via a first communication channel and where the first communication channel supports tracking of the first set of user input characteristics
1710

Determine, based on the one or more interaction metrics, a set of design parameters for formatting of a user interface to be displayed via a second communication channel, where the second communication channel supports tracking of a second set of user input characteristics
1720

Fig. 17

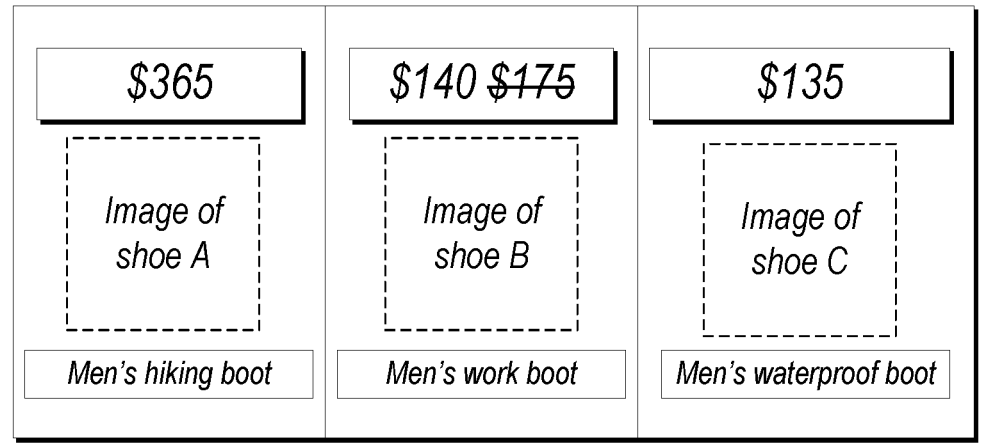
Fig. 19

ADJUSTING EMPHASIS OF USER INTERFACE ELEMENTS BASED ON USER ATTRIBUTES

PRIORITY CLAIM

The present application is a continuation of U.S. application Ser. No. 16/393,082, filed Apr. 24, 2019, which is incorporated by reference herein in its entirety.

BACKGROUND

Technical Field

Embodiments described herein relate to user interface technology and, in particular, to techniques for automatically generating customized user interfaces.

Description of the Related Art

User interfaces are often generated by multiple skilled designers, e.g., to combine quality coding techniques with graphical design to achieve desired functionality while pleasing the eye, achieving branding goals, or promoting desired user behaviors. Many entities may desire customized interfaces rather than using generic templates. Many entities do not have access, however, to coding or design expertise needed to generate an effective user experience.

BRIEF DESCRIPTION OF THE DRAWINGS

FIG. 2A is a diagram illustrating example user interface code and a resultant display of an identified component, according to some embodiments.

FIG. 5 is a flow diagram illustrating an example component-based method for automatically generating a user interface, according to some embodiments.

FIG. 17 is a flow diagram illustrating an example method for using cross-channel metrics, according to some embodiments.

FIG. 19 is a block diagram illustrating two example customized user interfaces, according to some embodiments.

Figure 1:
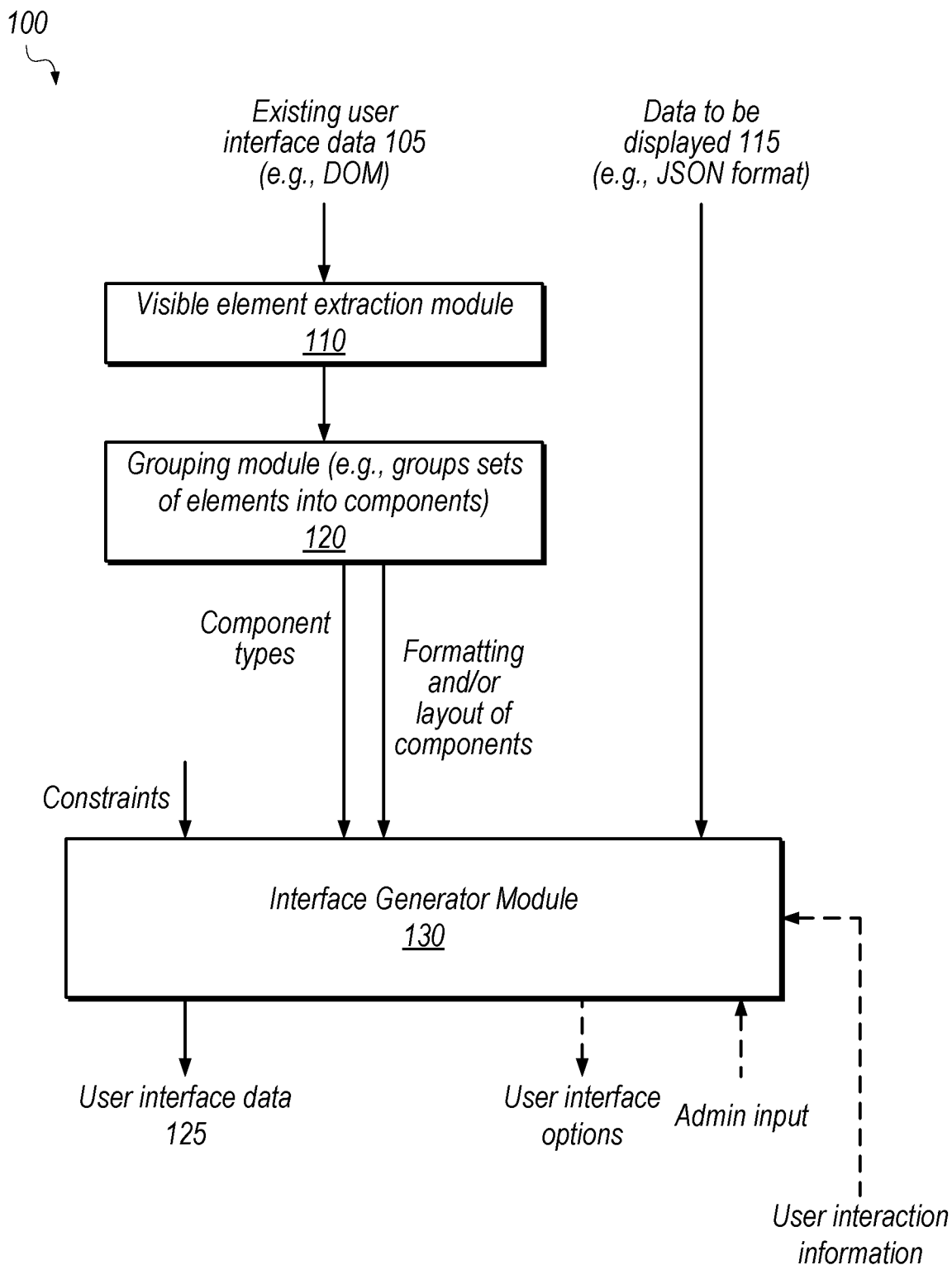
FIG. 1 is a block diagram illustrating an example system for automatically generating user interface data, according to some embodiments.

This disclosure includes references to "one embodiment," "a particular embodiment," "some embodiments," "various embodiments," "an embodiment," etc. The appearances of these phrases do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. For example, a "module configured to select a component type" is intended to cover, for example, equipment that has a program code or circuitry that performs this function during operation, even if the circuitry in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element.

Accordingly, none of the claims in this application as filed are intended to be interpreted as having means-plus-function elements. Should Applicant wish to invoke Section 112(f) during prosecution, it will recite claim elements using the "means for" [performing a function] construct.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the context clearly dictates otherwise. Furthermore, the words "can" and "may" are used throughout this application in a permissive sense (i.e., having the potential to, being able to), not in a mandatory sense (i.e., must). The term "include," "comprise," and derivations thereof, mean "including, but not limited to." The term "coupled" means directly or indirectly connected.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. When used herein, the term "or" is used as an inclusive or and not as an exclusive or. For example, the phrase "at least one of x, y, or z" means any one of x, y, and z, as well as any combination thereof (e.g., x and y, but not z or x, y, and z).

DETAILED DESCRIPTION

In various disclosed embodiments, a computing system is configured to automatically generate user interface code for input data to be displayed. For example, the input data may be specified via an application programming interface (API) without complete specification of layout or formatting and the computing system may automatically group and format the input data. Various techniques discussed herein are component-based and map user input data to known component types and automatically format components. A component may include multiple visible user interface elements (e.g., images, text strings, links, etc.). In some embodiments, a machine learning engine is trained to identify and format components based on code from prior user interfaces.

In some embodiments, the system may generate a user interface subject to one or more constraints. For example, the constraints may be based on available screen resolution, predicted events, style from another interface, etc. In some embodiments, techniques similar to those used to identify components on existing interfaces may also identify and report duplicate designs (and may automatically merge such portions of the interface).

In various embodiments, the disclosed techniques may allow entities to automatically generate user interfaces without requiring knowledge of design or coding techniques. Further, the disclosed techniques may advantageously improve existing user interface technology, including automating design tasks that were previously performed manually, in a new way (e.g., using component-based techniques). These techniques may improve user interface flexibility and functionality, in various embodiments.

Overview of System for Automatically Generating User Interfaces

FIG. 1 is a block diagram illustrating an example system for automatically generating user interface data, according to some embodiments. In the illustrated embodiment, system 100 analyzes existing user interface data 105, receives data to be displayed 115, and automatically generates and outputs user interface data 125. In the illustrated embodiment, system 100 includes visible element extraction module 110, grouping module 120, and interface generator module 130. In some embodiments, system 100 also presents user interface options and receives admin input and/or user interaction information (e.g., which may be used to train computer learning implementations of module 130).

Visible element extraction module 110, in the illustrated embodiment, receives data 105 from an existing user interface. This data may be specified according to a hierarchical tree structure (e.g., using document object model (DOM) techniques). In some embodiments, module 110 extracts elements that may be visible in the user interface from the user interface data 105. For example, these elements may be leaf nodes of the tree structure.

Grouping module 120, in some embodiments, is configured to group sets of extracted elements into components. In some embodiments, this grouping is based on coordinates of the elements and depth of the elements within the tree. In the illustrated embodiment, module 120 provides detected component types and display parameters (e.g., formatting and/or layout components) to interface generator module 130.

Interface generator module 130, in the illustrated embodiment, is configured to generate user interface data 125 based on the data from module 120 and one or more input constraints. In some embodiments, module 130 provides one or more options, e.g., selectable by an administrator for implementation in the interface. In some embodiments, module 130 receives information based on user interaction with the interface, which may be used for training, for example.

Various techniques disclosed herein may be used alone or in combination. The disclosed architectures are included for purposes of illustration, but are not intended to limit the scope of the present disclosure. For example, various functionality described with reference to one module may be performed by other modules, in other embodiments.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Note that the modules of FIG. 1 may be included in different computing systems, in some embodiments. For example, in some embodiments a first computing system may generate the component types and formatting/layout information and transmit this data to a second computing system that implements module 130. Further, various actions discussed herein may be performed in close time proximity or may be separated. For example, once a set of component types and formatting/layout data has been generated, this data may be used to automatically generate other interfaces potentially indefinitely.

Example Code, Elements, Components, and User Interface

FIG. 2A is a diagram illustrating example user interface code and a resultant display of an identified component, according to some embodiments. In the illustrated embodiment, the leaf nodes (the elements) in code 210 are emphasized using dashed and dotted lines. These elements can be displayed in interface 220 (although that element may not always be displayed, e.g., due to input variables, user scrolling, user interaction, etc.). As indicated in FIG. 2A, elements may be grouped into components based on coordinates, classification, and/or depth in the interface code hierarchy.

As used herein, the term "element" refers to information that can be output on a user interface, e.g., visually or audibly. Elements are typically explicitly indicated by user interface code. For hierarchical code such as Hypertext Markup Language (HTML), for example, elements are typically leaf nodes. Non-limiting examples of types of elements include text, links, images, etc.

As used herein, the term "component" refers to a group of one or more elements. Typically, components include multiple elements. Components are typically not explicitly identified by traditional user interface code. Rather, various disclosed techniques automatically detect component types for use in auto-generating user interfaces. A component type may define a set of elements that make up a class of components. For example, a component type may include an image, a link, and multiple lines of text. The component type may also have corresponding display parameters that specifying formatting and layout of elements within components of the type. In some embodiments, component types are used to automatically organize user interface inputs into a user interface.

In the example of FIG. 2A, displayed interface 220 includes an identified component 230 that includes an image element 232, a label element 234, and a link element 236. For example, for the code 210, the image element 232 may be an image indicated by the <img src=" . . . ">line, the label 234 may display the text "John Doe" and the link 236 may be selectable to visit www.jd.com.

Figure 2B:
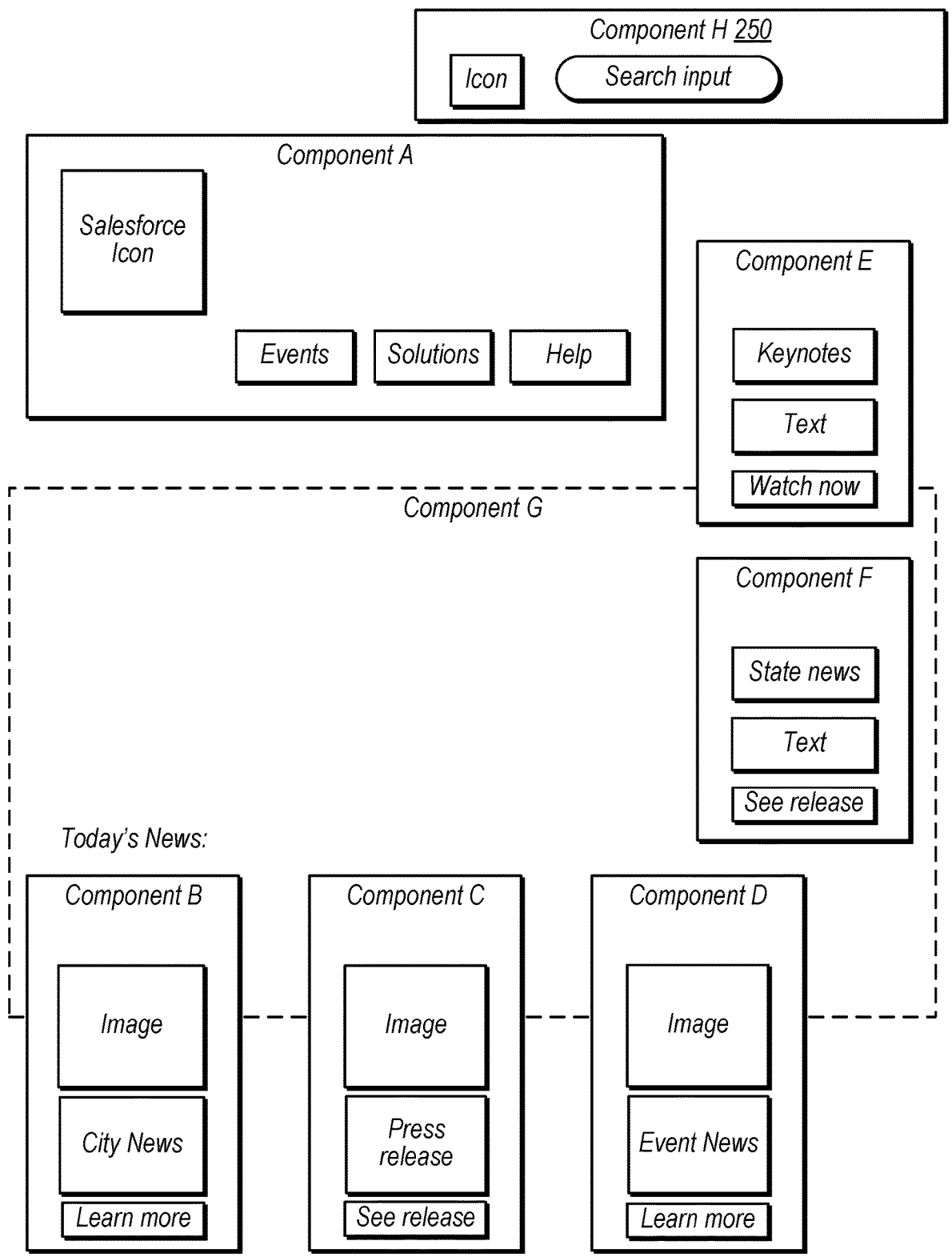
FIG. 2B is a block diagram illustrating an example user interface with multiple component types, according to some embodiments.

FIG. 2B is a block diagram illustrating an example user interface with multiple identified components, according to some embodiments. In the illustrated embodiment, the interface includes components A through H. In the illustrated embodiment, components B, C, and D may be identified as the same component type and components E and F may be identified as the same component type. Note that the same type of component may be used to display different content, but may use the same set of elements to do so.

Component G, in the illustrated embodiment, may include a single element, e.g., a background image for the interface. As shown, components may be at least partially overlapping in a display space, in some embodiments. Component A is an overall toolbar for multiple pages of a web interface and component H is a search component. Note that the components in FIG. 2B may be identified using techniques discussed in further detail below in an existing interface. In other embodiments, component types for the illustrated embodiments may be automatically determined for user interface inputs and the interface of FIG. 2B may be generated automatically.

FIGS. 3-17, discussed in further detail below, discuss example techniques for determining a set of component types from one or more existing interfaces. Note that various techniques discussed in combination with other techniques may also be used separately and the various techniques disclosed herein may be combined in various different combinations.

Example Interface Generator Techniques

Figure 3:
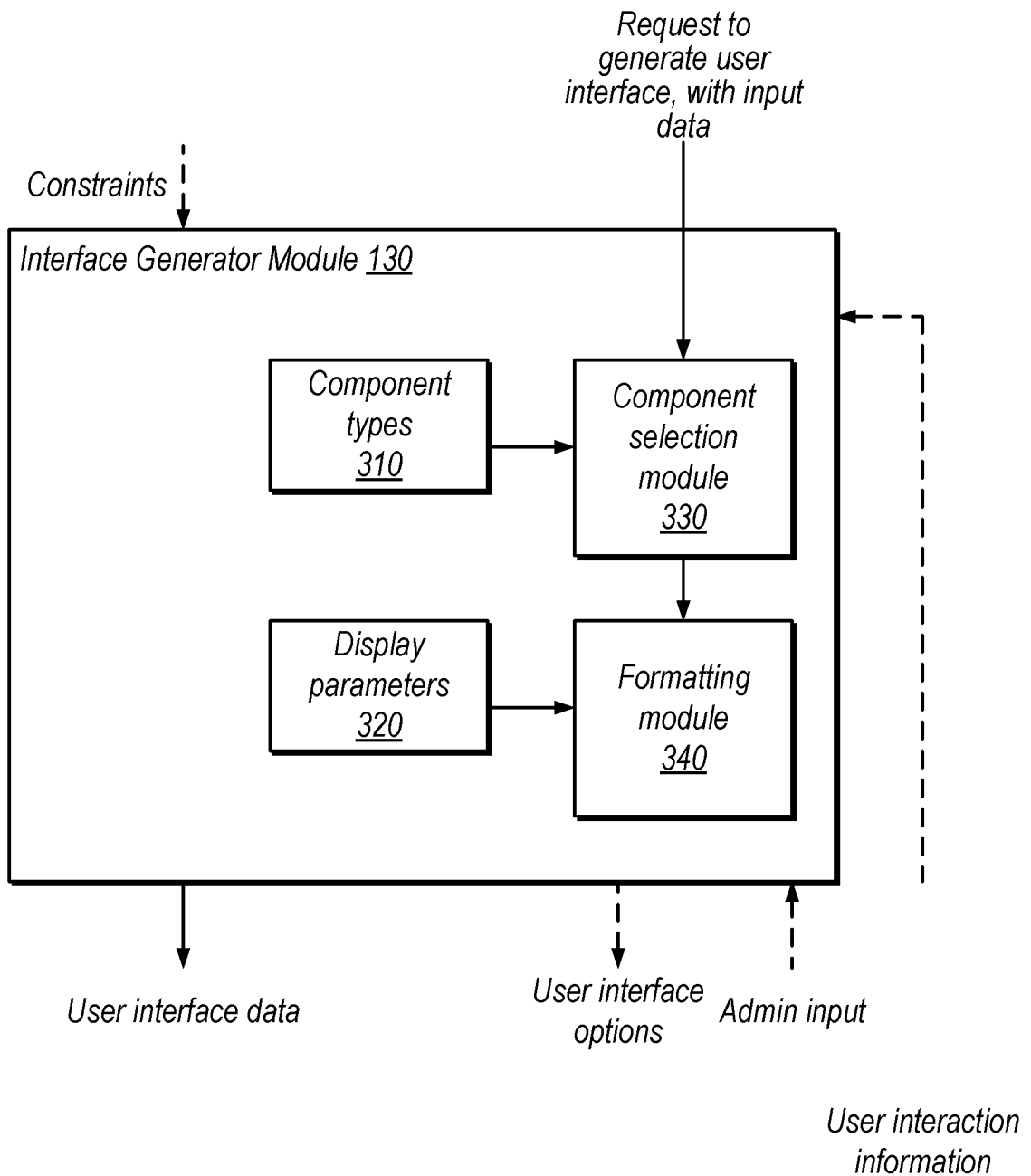
FIG. 3 is a block diagram illustrating a more detailed example of the interface generator module shown in FIG. 1, according to some embodiments.

FIG. 3 is a block diagram illustrating an interface generator module, according to some embodiments. In the illustrated embodiment, module 130 stores component types 310 and display parameters 320. This information may be automatically generated based on existing interfaces and/or user specified. For example, grouping module 120 may generate this information and/or a user may generate or modify the information. Component types are discussed in detail above. Display parameter 320, in some embodiments, indicate formatting within components and/or among components, and may indicate additional information such as fonts, colors, etc.

In the illustrated embodiment, module 130 includes a component selection module 330 and a formatting module 340.

Component selection module 330, in some embodiments, is configured to receive input data for a user interface and automatically select one or more component types to represent the user input data. The input data may be in JavaScript Object Notation (JSON) format, for example, or some other organization. The input data may not, however, specify how it is to be displayed. In some embodiments, component selection module 330 is configured to determine element types in the input data and match those types to element types in known component types 310. Based on this matching, component selection module 330 may select one or more component types.

Note that, for a given set of input data, component selection module 330 may select multiple component types as discussed below with reference to FIG. 20. In some embodiments, component selection module 330 may select one or more component types that provide the best match for the input data, even if the types of elements are not an exact match.

Formatting module 340, in the illustrated embodiment, is configured to format the components according to the selected component types and display parameters 320. In some embodiments, the formatting is based on additional constraints, such as screen resolution, screen size, display technology, specified fonts, etc. Module 340 may layout selected components, format multiple components, layout elements within selected components, and/or format within selected components. In some embodiments, formatting module 340 is configured to output user interface data, and may cause display of an interface based on the user interface data. Formatting may include positioning, color, font, spacing, layout, size, rotation, transparency, borders, etc. within and/or among components. In some embodiments, the display parameters 320 may include information indicating positioning of certain component types in prior interfaces, which may be used to position corresponding components in automatically generated interfaces.

As discussed in further detail below, component types 310, display parameters 320, module 330, and/or module 340 may be modified based on user input and/or interface interaction. For example, module 130 may present component type and/or formatting options to an administrator, who may select desired options. In some embodiments, modules 330 and/or 340 implement one or more machine learning engines that may be trained to provide more desirable outputs based on administrator input. Similarly, information regarding user interaction with the interface such as time spent on portions of the interface, selection activity (e.g., clicking), etc. may be used to train these modules (and/or other modules discussed herein).

Figure 4:
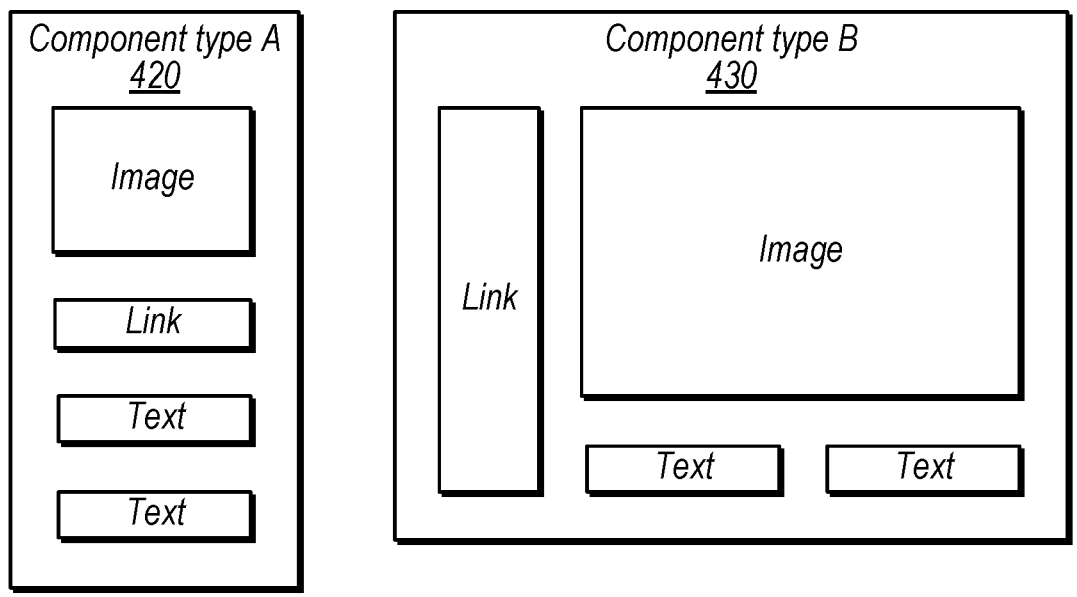
FIG. 4 is a diagram illustrating two example component types identified for a set of input data, according to some embodiments.

FIG. 4 illustrates two example component types selected for a set of input data 410, according to some embodiments. In the illustrated embodiment, a set of input data 410 for an article includes a link to the article, two separate text elements (describing the article and providing a date of the article), and an image from the article. For example, a component based on this data may be displayed on a front page of a web interface and selectable to read the article. In the illustrated embodiment, module 130 may select two component types A and B 420 and 430 for this input data. As shown, the two component types have the same set of element types but are formatted quite differently. Module 130 may select a final component based on user input or based on control by formatting module 340, for example. In some embodiments, a user may enter a set of data to be displayed and search for matching component types. The system may display multiple potential component types and allow the user to select a preferred type.

In some embodiments, generating user interfaces using automatic techniques may advantageously decrease maintenance and/or migration of user interfaces, thereby preventing a build-up of user interface code from previously existing user interfaces. Further, automatically generating interfaces may be advantageous by allowing differences in interfaces generated by the same interface module. For example, for different languages with different average word lengths, module 130 may generate different interfaces for the same underlying information, to better display the information in different languages.

In some embodiments, the interface generator module 130 generates user interface data based on voice interactions. For example, after receiving instructions from a user through voice interactions, module 130 may generate a user interface that summarizes the interactions, thereby allowing the user to confirm or modify the interactions. In some embodiments, the user interface summary of the voice interactions may advantageously allow the user to provide accurate instructions while driving, walking, etc. with a small amount of interaction required through touch (e.g., screen clicking). In some embodiments, interface generator module 130 generates a user interface for one or more of the following display technologies: a graphical user interface, a voice user interface (VUI), virtual and/or augmented reality (VR/AR), head-up display (HUD), etc. In some embodiments, the target output platform may be an input constraint that is used in selecting component types. For example, some component types may be determined to be more desirable for augmented reality than for a traditional display.

In some embodiments, the interface generator module 130 may provide a seamless experience across multiple types of output devices and may automatically select one or more output types to display certain components automatically. For example, based on context parameters, module 130 may decide to output a first component via a monitor and audibly, but output a second component via augmented reality only.

In some embodiments, the disclosed techniques may facilitate integration of external services into an existing interface. For example, the disclosed techniques may be used to automatically format interfaces with data from the external database to maintain the look and feel of the existing database.

FIG. 5 is a flow diagram illustrating an example component-based method for automatically generating a user interface, according to some embodiments. The method shown in FIG. 5 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 510, in the illustrated embodiment, a computing system stores template information that defines a plurality of component types and one or more display parameters identified for one or more user interfaces. In the illustrated embodiment, a component type specifies a set of one or more user interface element types included in the component and a display parameter specifies how one or more components are to be displayed. In some embodiments, a plurality of component types are determined from one or more existing user interfaces, according to the techniques discussed above. In some embodiments, the computing system implements style transfer functionality to transfer the style of one of the existing interfaces to the automatically generated interface and/or merge two or more styles. Style may be implemented by selecting corresponding component types, display parameters, fonts, etc.

At 520, in the illustrated embodiment, the computing system receives a request to automatically generate a user interface in accordance with the template information, wherein the request specifies data for a set of elements to be displayed in the user interface.

At 530, in the illustrated embodiment, the computing system groups ones of the set of elements into multiple components according to multiple ones of the component types. In some embodiments, a machine learning module groups elements into components and may be trained based on past user input and/or user interactions with automatically generated interfaces.

At 540, in the illustrated embodiment, the computing system formats the components according to the display parameters. The display parameters may specify formatting within one or more component types and/or among multiple components. The formatting may be based on one or more display characteristics of a display device. In non-visual interface embodiments, the formatting may be based on one or more output device characteristics (e.g., audio device type, target environment, etc.).

At 550, in the illustrated embodiment, the computing system causes display of a user interface that displays the components based on the formatting. This may include transmitting the interface via one or more communication channels or controlling a display device, for example.

Example Style Transfer Techniques

As briefly discussed above, the disclosed techniques may be used to perform a style copy procedure. For example, the existing interface may be crawled and analyzed to determine a plurality of component types and/or display parameters. Examples of display parameters include, without limitation, layout parameters, formatting parameters, fonts, etc.

This component types and display information may then be used to generate an interface that exhibits the same style as the crawled interface. The new interface may be specified using input information that does not specify formatting, or using code such as a DOM that is modified based on the component types from the crawled interface. In some embodiments, component types may be determined based on elements from both interfaces (e.g., to generate new component types that do not exist in either interface. In some embodiments, interfaces may be merged to maintain component types from both interfaces in an output interface.

This may allow an entity to use an out-of-the-box template to initially set up their web application, but then copy style from another interface, such as their marketing site to achieve the correct style.

In some embodiments, an analysis module may also provide information regarding conventionality and/or design heuristics of the target interface. This module may provide insight regarding how similar the target is to known components, for example. The module may provide a topology score, which may be implemented as a chrome extension, sketch plugin, or app builder to facilitate manual interface design. In some embodiments, this module may objectively score designs based on the quality of their components, the number of different component types used, etc.

Example Display Device Constraints

As briefly discussed above, interface generator module 130 may generate interfaces based on one or more input constraints. For example, certain layout techniques may be preferable for smaller or larger displays or certain resolutions. Further, certain component types may be preferable for various device constraints. In some embodiments, interface generator module 130 may select from among multiple matching component types for a set of input data based on one or more device constraints such as resolution, display type, or display size. In some embodiments, interface generator module 130 may use different formatting and/or layout techniques based on different values of constraints. Therefore, the same underlying interface code may automatically generate markedly different interfaces in different scenarios, in some embodiments, without requiring hard-coding of templates for the different scenarios. Additional examples of constraints include user profile information, location, record type, domain, community, etc. In some embodiments, machine learning models may be separately trained for different constraint values.

Automatically Generating Interfaces for Predicted Events

In some embodiments, a computing system (which may or may not be the same computing system that implements interface generator module 130) is configured to predict that user input will be needed and automatically initiate a procedure that requests user input, e.g., based on one or more automation parameters. As one example, based on a user crossing a geo-fence, the computing system may initiate a procedure to request user input to book a hotel. As another example, based on a change in a customer relationship management database, the computing system may initiate a procedure to update a follow-up date for an event. In some embodiments, there is no pre-determined interface template for the initiated procedure. Rather, in these embodiments, interface generator module 130 is configured to automatically select one or more component types for an interface to request entry of the user input. Module 130 may also format within and/or among selected components. Note that the prediction may be speculative in nature, e.g., the user may decide not to provide input.

Automation parameters may include, for example: threshold velocity, location, calendar information, account information, location information, time information, information regarding communications, etc. In various embodiments, these parameters may be used to determine when to speculatively initiate a procedure. In some embodiments, some of these parameters may also be used as context parameters to constrain the interface that is automatically generated.

Note that interface generator module 130 may also select from among multiple types of interfaces to output the speculatively-generated interface. For example, based on a current velocity of the user, the system may predict that the user is driving and determine that a voice interface may be most effective. In this scenario, the computing device may call the user via a phone (or output audio directly if the device is a mobile device or vehicle computer system). In other situations, the computing system may determine to visually display the interface. Note that the computing system may select a channel for delivering the generated user interface based on context information as well, e.g., determining whether to send an SMS message, initiate a phone call, use a Bluetooth connection, use an internet connection, etc. For various types of interfaces, the selected component types may be used to control output of the interface information and receive user input. For example, audio output may be ordered based on the selected component type or a visual output may be formatted based on the selected component type.

In some embodiments, a prediction module is configured to generate a set of input data (e.g., in a JSON format) and provide it to interface generator module 130 without indicating formatting or organization of the input data. Module 130 may automatically generate an interface for the predicted task based on the various techniques discussed above. The interface generator module 130 may include an artificial intelligence engine to improve component type selection and formatting based on user interaction with generated interfaces for predicted tasks and/or administrator feedback.

In some embodiments, module 130 may automatically generate component types and/or display parameters from an existing user interface using any of the various techniques disclosed herein in order to match the look and feel of the existing interface when automatically generating interfaces for predicted events. This may allow the computing system to speculatively generate such interfaces even when it does not control the existing interface, for example.

In some embodiments, user information in the form of behavior, patterns, context, and/or signals are used to predict what users will likely be doing in the future on their device (e.g., changes to be displayed on a screen of a device of the user). In some embodiments, user information includes one or more of the following: calendar, email, location, time, velocity, etc. In some embodiments, user activity, such as clicking and/or usage patterns is used to predict user intentions (e.g., what the user desires to do at a given point in time).

In some embodiments, user information used to predict and generate one or more user interfaces for a user may advantageously improve navigation within the user interface (e.g., the user can locate what they are looking for quickly).

Figure 6:
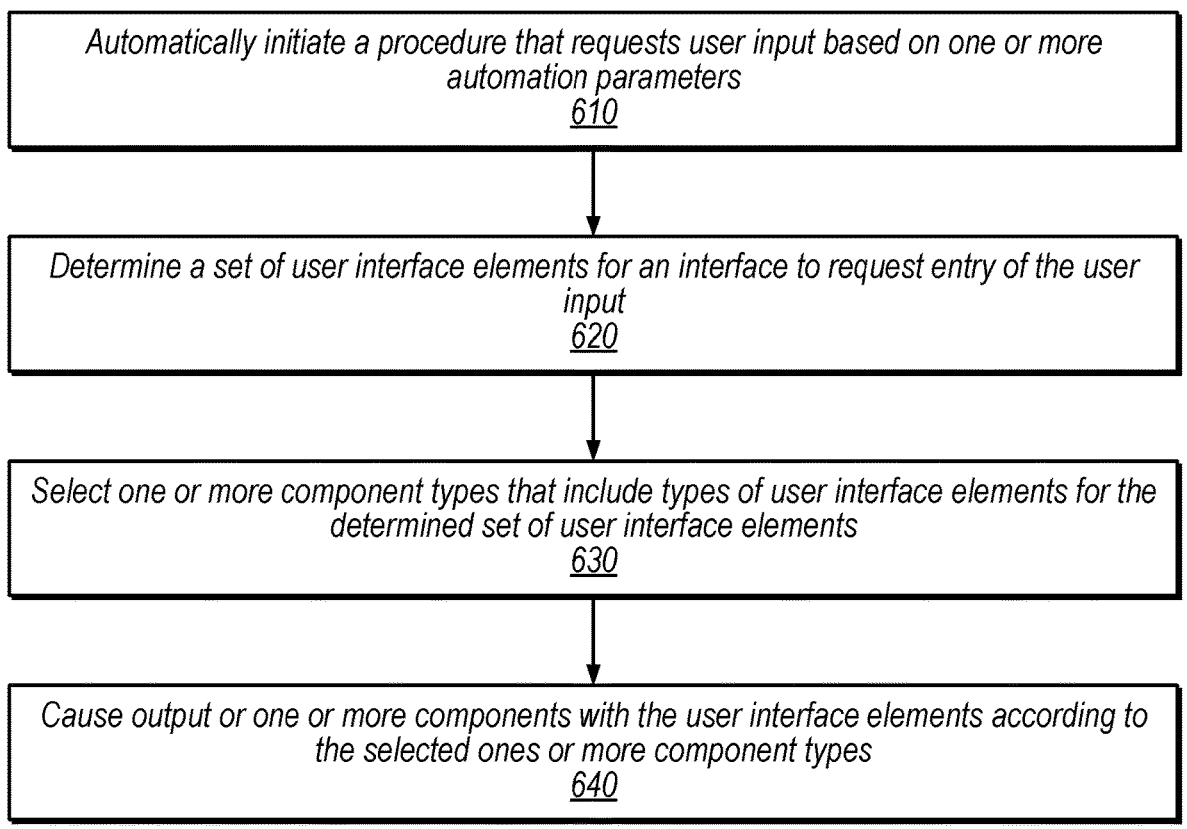
FIG. 6 is a flow diagram for automatically generating user interface information for a predicted event, according to some embodiments.

FIG. 6 is a flow diagram illustrating a method for automatically selecting component types for a predictive interface, according to some embodiments. The method shown in FIG. 6 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 610, in the illustrated embodiment, a computing system automatically initiates a procedure that requests user input based on one or more automation parameters.

At 620, in the illustrated embodiment, the computing system determines a set of user interface elements for an interface to request entry of the user input. This may be based on input data that specifies information to be displayed and information to be received.

At 630, in the illustrated embodiment, the computing system selects one or more component types that include types of user interface elements for the determined set of user interface elements. Note that a direct match of element types may not be required, but module 130, for example, may attempt to select a component that includes fields for all the input data. In some embodiments, component types may be selected based on one or more context parameters. In some embodiments, component types may be selected based on a target interface type (e.g., based on display resolution, type of display, whether the display includes audio and/or visual outputs, etc.).

At 640, in the illustrated embodiment, the computing system causes output of one or more components with the user interface elements according to the selected ones or more component types. In some embodiments, this may include sending information specifying the user interface via one or more communication channels. Note that various elements discussed above may be performed locally by the device that outputs the components or by another device (e.g., by a remote server).

Example Machine Learning Techniques

As noted above, interface generator module 130 may, in various embodiments, use one or more machine learning modules to automatically generate user interface data. Further, as discussed above, various information may be used as training or input data for these machine learning modules, such as component type definitions, formatting information, display parameters, grouping information, classification information, etc. As described in more detail below with reference to FIGS. 7-9, various embodiments may utilize user feedback as training data to further refine one or more machine learning modules used to automatically generate user interfaces.

Figure 7:
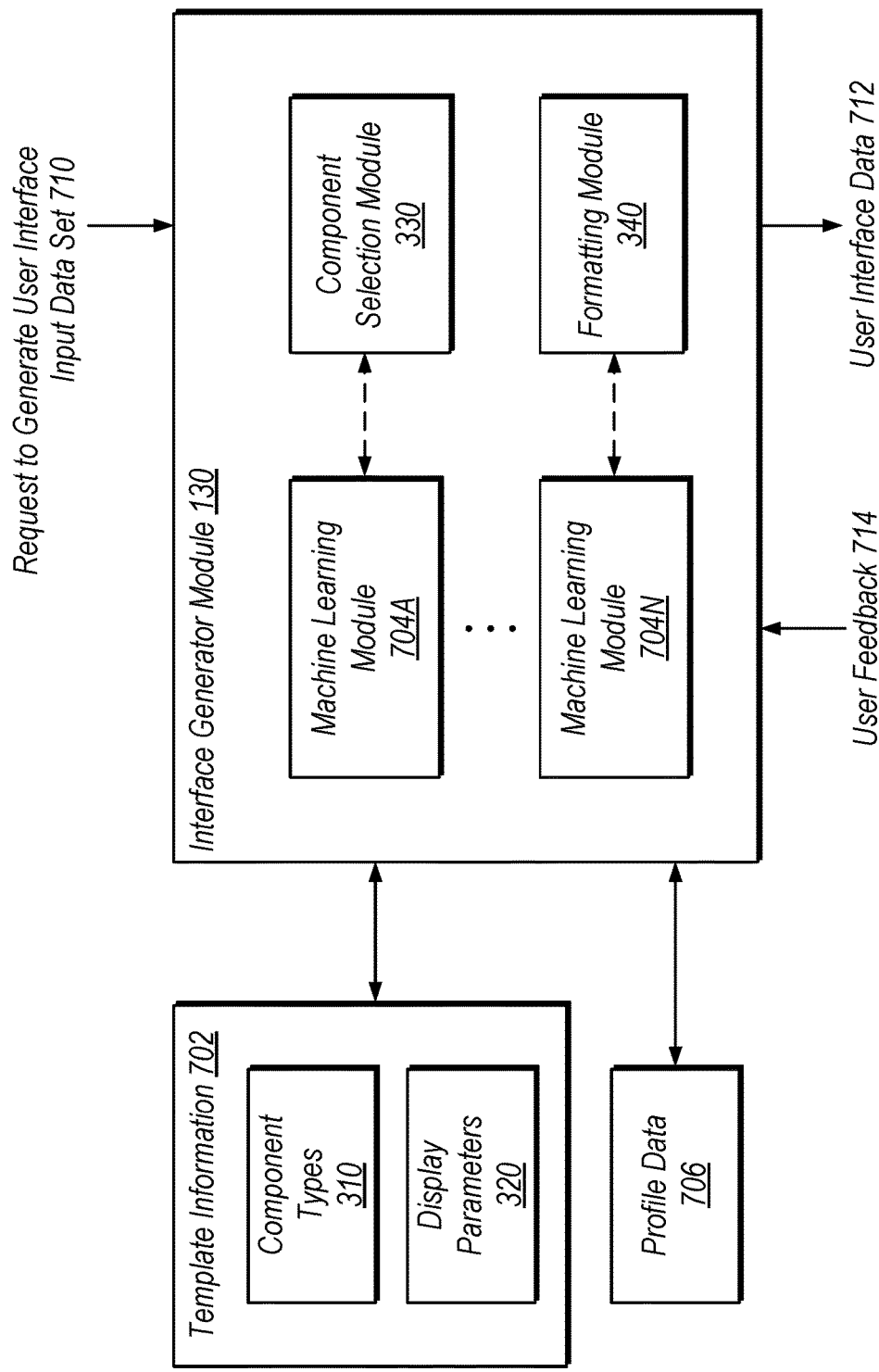
FIG. 7 is a block diagram illustrating an example interface generation module, according to some embodiments.

Referring now to FIG. 7, a block diagram of an example embodiment of interface generator module 130 is depicted, according to some embodiments. In FIG. 7, interface generator module 130 includes component selection module 330, formatting module 340, and machine learning modules 704. Note that, although shown separately in FIG. 7, one or more machine learning modules 704 may be included as part of component selection module 330 or formatting module 340, in some embodiments. Machine learning modules 704, also referred to herein as machine learning engines, may use any of various suitable machine learning algorithms. For example, in some embodiments, the machine learning engines may use neural networks, vector machines, gradient boosting, naïve Bayes, linear regression, logistic regression, reduction, random forest, etc.

FIG. 7 further includes template information 702. In various embodiments, the template information 702 defines a plurality of component types 310 and one or more display parameters 320 identified for one or more user interfaces. As discussed in more detail above, a component type, in various embodiments, specifies a set of one or more user interface element types included in a given component, and a display parameter specifies how one or more components are to be displayed (e.g., within a larger user interface). Note that, in various embodiments, template information 702 (including component types 310 and display parameters 320) may be either stored by module 130 or on one or more storage media accessible to module 130.

As described herein, interface generator module 130 is operable to automatically generate user interface data, according to various embodiments. For example, in the depicted embodiment, interface generator module 130 receives a request to generate a user interface, where the request includes an input data set 710. As described above in reference to FIG. 3, interface generator module 130 may generate user interface data 712 by selecting one or more component types, element types, and display parameters used to display the input data set 710. The user interface data 712, in various embodiments, may specify one or more user interfaces that may be provided to end users. Further, in some embodiments, the user interface data 712 may specify multiple suggested components, component types, or user interfaces that may be provided to a user (e.g., an administrator or UX designer) who may select one or more aspects of the user interface that is ultimately exposed to end users, as described in reference to FIG. 8.

Interface generator module 130 may receive user feedback 714 from one or more users based on the user interface data 712. In some embodiments, the user feedback 714 may correspond to user interaction with a user interface, including interactions such as selection activity (e.g., clicking), the time spent viewing different portions of the component or interface, user interface elements over which the user hovered a cursor, etc. In some embodiments, the user feedback 714 may correspond to the user interaction of individual users or to the user interaction of one or more groups of users.

In embodiments in which multiple suggested user interfaces or user interface components are provided to a user, the user feedback 714 may include information about the suggested interface or component selected by the user. For example, the user feedback 714 may indicate which of the suggested user interfaces or user interface components was selected, specify a selected component type, specify various display parameters or formatting characteristics associated with the selected user interface or component(s) (e.g., size, rotation, layout, font color, font size, etc.), etc.

In various embodiments, the user feedback 714 may be used to train one or more of the machine learning modules 704. For example, in some embodiments, one or more of the machine learning modules 704 may use data corresponding to user interaction with a given user interface or component as training data in an attempt to maximize or encourage particular user behavior, such as increasing the number of times link elements are selected, increasing the amount of time spent viewing various portions of the interface, etc. Further, in various embodiments, machine learning modules 704 may be trained based on user feedback 714 associated with a selected one of multiple suggested user interfaces or components for an input data set 710. For example, one or more machine learning modules 704 may use, as training data, the information (e.g., display parameters, component types, etc.) associated with the component or user interface selected by a user (e.g., a designer). Based on this data, the machine learning modules may modify the manner in which the suggested user interfaces or components are selected, in some embodiments. For example, in some embodiments, after undergoing training based on this feedback data, interface generator module 130 may suggest user interfaces or components that are similar to those previously selected by the user, similar users, or for similar input data sets 710. Similarly, interface generator module 130 may format within components or among components based on the feedback data. Note that machine learning modules 704 may be trained based on the user feedback 714 in a supervised or unsupervised manner, according to various embodiments.

In some embodiments, multiple types of machine learning modules may be used to automatically generate user interfaces. For example, one machine learning engine may select component types and another engine may layout and format selected components. In embodiments with refinement of machine learning modules based on user feedback, all or a portion of the implemented types of machine learning modules may be refined.

FIG. 7 further depicts profile data 706. As noted above, in some embodiments, the user feedback 714 may correspond to the user interaction of individual users or to the user interaction of one or more groups of users. In some such embodiments, data corresponding to individual users or groups of users may be used to generate profiles, specified in profile data 706, for those individual users or groups, which, in turn, may be used as an input to one or more of the machine learning modules 704. In various embodiments, this may enable interface generator module 130 to automatically generate user interfaces or user interface components that are customized for a given individual or group based on the individual or group's respective user activity.

Figure 8:
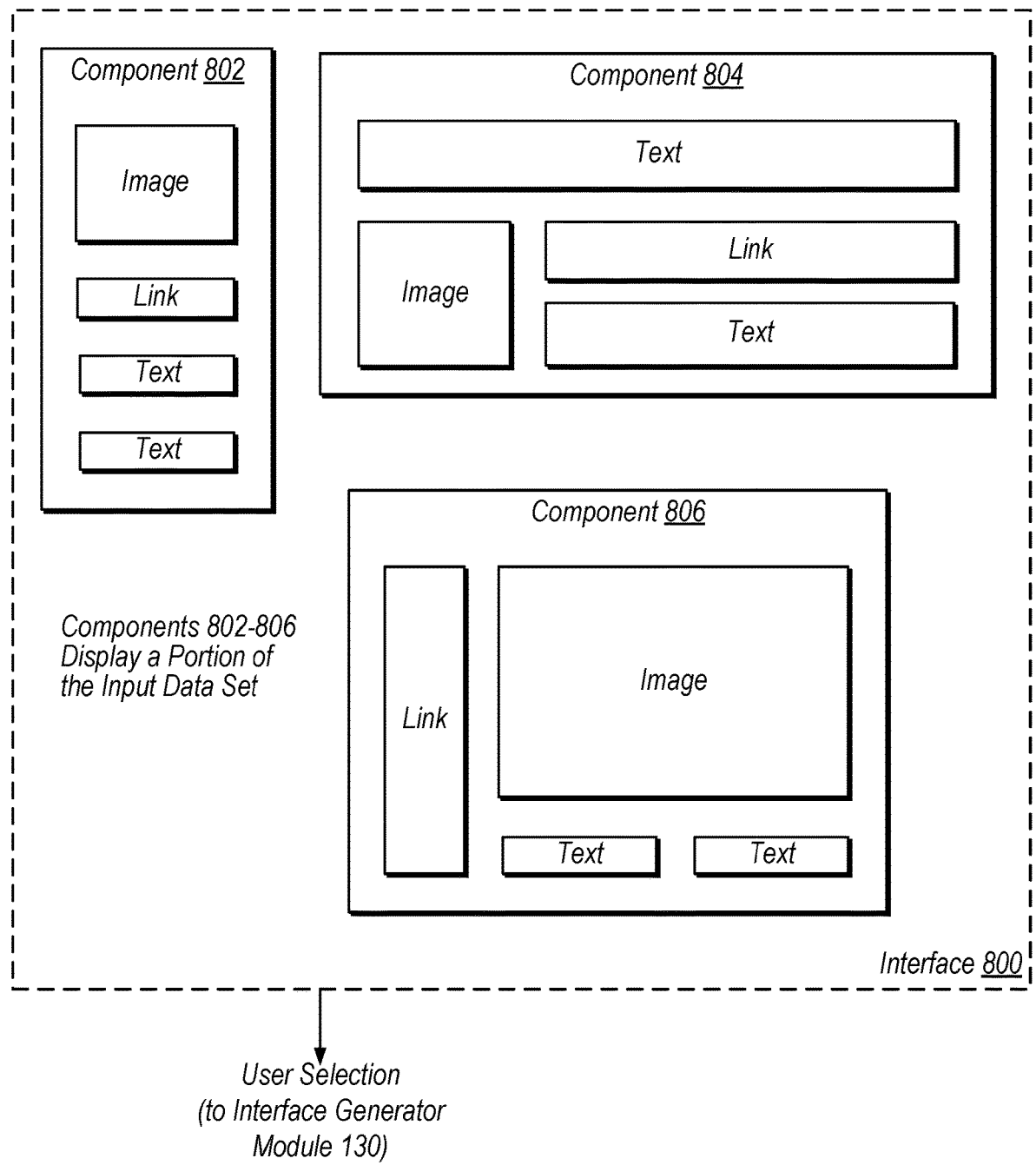
FIG. 8 is a block diagram illustrating an example interface used to suggest various automatically generated user interface components, according to some embodiments.

FIG. 8 illustrates an example interface used to suggest various automatically generated user interface components, according to some embodiments. In FIG. 8, interface 800 depicts components 802-806, each of which may be suggested user interface components used to display a portion of the input data set 710. For example, as discussed with reference to FIG. 7, interface generator module 130 may receive a request to generate a user interface, where the request specifies an input data set 710. Interface generator module 130 may then automatically select (e.g., using component selection module 330) various suggested component types to use to display the input data set 710. Further, in various embodiments, module 130 may automatically generate representative components (e.g., components 802-806) corresponding to the suggested component types, and may cause display of the interface 800 that includes the representative components 802-806 to a user. The user may then select one or more of the suggested components 802-806 to use to display the input data set 710. This selection may be used to automatically generate, for the input data set 710, a user interface to expose to one or more end users. Further, as discussed above, the user's selection may be provided as user feedback 714 to interface generator module 130 to be used as training data for one or more machine learning module 704.

Note that, in various embodiments, the accuracy of the components 802-806 suggested to the user may be improved through an iterative reinforcement learning process in which the module 130 is further refined based on the user feedback 714. That is, applying various disclosed techniques, interface generator module 130 may be optimized to select the correct components to represent a given input data set 710 and lay the suggested components out, within a user interface, following best practices derived through the machine learning model. Thus, in various embodiments, interface generator module 130 may use the user selections to refine machine learning module(s) 704 and suggest improved user interfaces to the user.

Further note that, for clarity, only three components are shown in interface 800. This embodiment is provided merely as an example and is not intended to limit the scope of the present disclosure. In other embodiments, any suitable number of components may be provided in interface 800.

Figure 9:
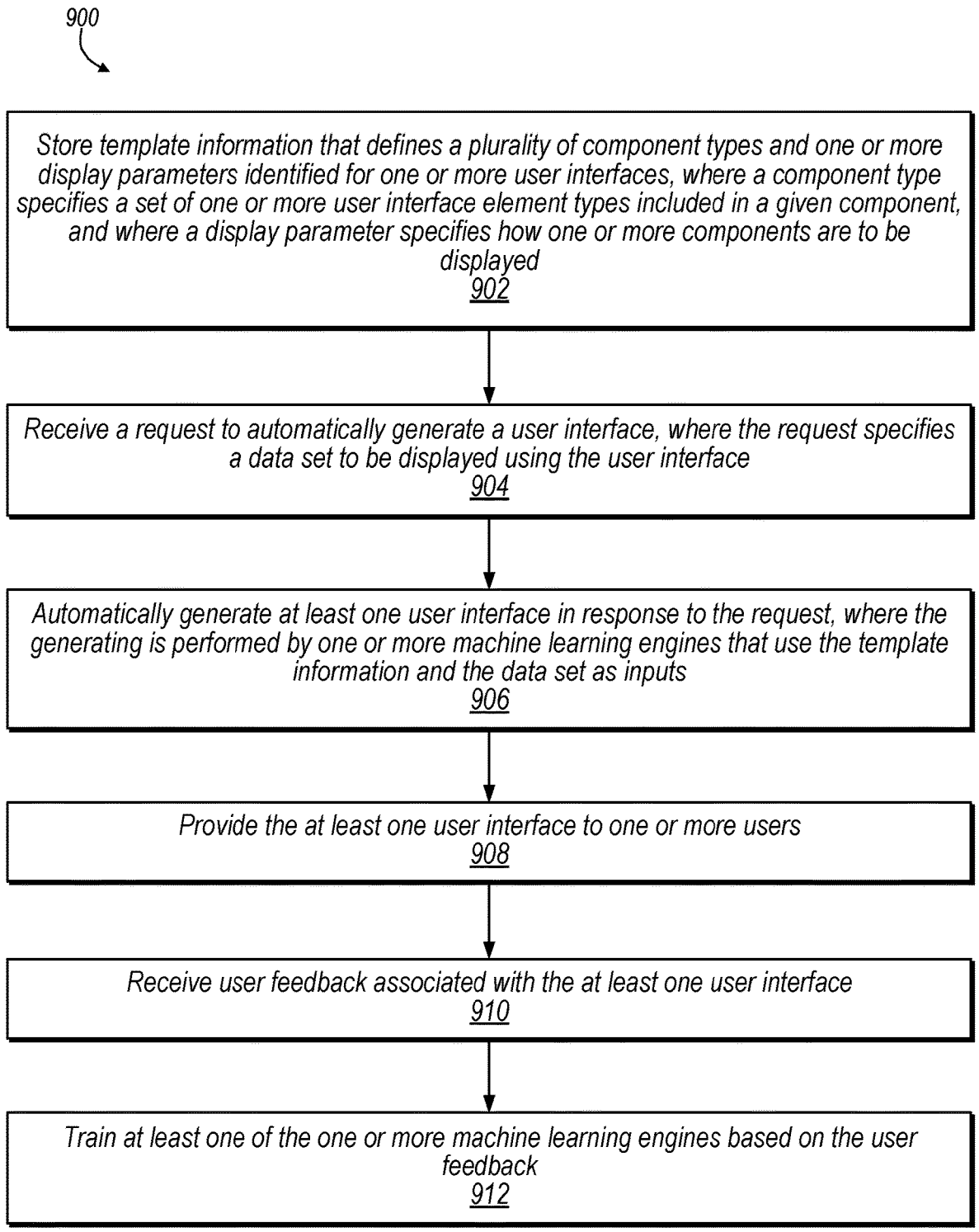
FIG. 9 is a flow diagram illustrating an example method for refining machine learning engines used to automatically generate component-based user interfaces, according to some embodiments.

Referring now to FIG. 9, a flow diagram illustrating an example method 900 for refining, based on user feedback, machine learning engines used to automatically generate component-based user interfaces, according to some embodiments. The method shown in FIG. 9 may be used in conjunction with any of the computer circuitry, systems, devices, elements, or components disclosed herein, among others. In various embodiments, method 900 may be performed to refine one or more machine learning modules 704 included in the interface generator module 130 of FIG. 7. In various embodiments, method 900 may be performed by a computer system that includes (or has access to) a non-transitory, computer-readable medium having program instructions stored thereon that are executable by the computer system to cause the operations described with reference to FIG. 9. In FIG. 9, method 900 includes elements 902-912. While these elements are shown in a particular order for ease of understanding, other orders may be used. In various embodiments, some of the method elements may be performed concurrently, in a different order than shown, or may be omitted. Additional method elements may also be performed as desired.

At 902, in the illustrated embodiment, a computer system stores template information that defines a plurality of component types and one or more display parameters identified for one or more user interfaces. In the illustrated embodiment, a component type specifies a set of one or more user interface element types included in a given component, and a display parameter specifies how one or more components are to be displayed.

At 904, in the illustrated embodiment, the computer system receives a request to automatically generate a user interface, where the request specifies a data set to be displayed using the user interface.

At 906, in the illustrated embodiment, the computer system automatically generates at least one user interface in response to the request, where the generating is performed by one or more machine learning modules that use the template information and the data set as inputs. For example, in response to the request, one or more machine learning modules 704 may use the input data set 710 and the template information 702 to generate user interface data 712. As noted above, user interface data 712 may specify one or more automatically generated user interfaces.

At 908, in the illustrated embodiment, the computer system provides the at least one user interface to one or more users. In some embodiments, provided interfaces may include a selection of one or more component types through which to display the input data set 710 and an arrangement of one or more components, corresponding to the one or more component types, displaying the input data set 710 in one or more user interface elements.

At 910, in the illustrated embodiment, the computer system receives user feedback associated with the at least one user interface. As noted above, the user feedback 714 may take various forms. For example, in some embodiments, the user feedback includes data corresponding to user interaction with the at least one user interface. In some embodiments, for example, the data corresponding to the user interaction includes at least one of click data for one or more user interface elements included in the at least one user interface, or hover data for one or more user interface elements included in the at least one user interface. In other embodiments, the user feedback 714 may include data corresponding to the user interaction of a particular user or a particular set of one or more users (e.g., all or a subset of users associated with a particular tenant in a multi-tenant system).

At 912, in the illustrated embodiment, method 900 includes training at least one of the one or more machine learning modules based on the user feedback. In some embodiments, element 912 may include selectively training at least one of the one or more machine learning modules based on the data corresponding to the user interaction of a particular user or a particular set of one or more users.

Note that, in some embodiments, automatically generating the at least one user interface may include automatically selecting a plurality of suggested component types for a subset of the input data set 710. For example, in some such embodiments, method 900 may further include automatically generating, for the plurality of suggested component types, a corresponding plurality of representative components, and causing display of a particular user interface that includes the corresponding plurality of representative components, where each of the corresponding plurality of representative components depicts the subset of the data set. Further, in some such embodiments, the computer system may receive input indicating a selected component type of the plurality of suggested component types, where the at least one user interface provided to the one or more users includes at least a portion of the data set depicted using the selected component type.

Further note that, in some embodiments, providing the at least one user interface to the one or more users includes providing the at least one user interface in a first interactive format (e.g., via display on a computer monitor) and in a second, different interactive format (e.g., via an AR/VR device, HUD device, display on mobile device, an audio format, or any other suitable interactive format), and the user feedback 714 may include data specifying an interactive format used by the one or more users to interact with the at least one user interface.

In some embodiments, method 900 may further include modifying the template information 702 based on the user feedback 714. For example, in some embodiments, the computer system may modify data associated with the component types 310 or display parameters 320 based on the particular component types or display parameters associated with a selected component type chosen by a user (e.g., an administrator). Additionally, in embodiments in which the user feedback 714 includes data corresponding to the user interaction of a particular user or a particular set of one or more users, method 900 may include generating a profile for the particular user, or the particular set of one or more users, where the profile may then be used as an input for at least one of the one or more machine learning modules 704.

Overview of Segmentation System

In disclosed embodiments, a computing system provides customized user interfaces to different groups of users. The system may generate different user interface designs and determine metrics (e.g., click through rate, click rank, etc.) for user interaction with the different designs. Based on the metrics and attributes of the users, the system may segment the users into groups that tend to interact well with certain interface designs. For example, in the context of a merchant interface that shows product results for search queries, one type of interface may be better for budget-conscious users and another type of interface may be better for style-conscious users.

The computing system may generate different designs for a user interface where the inclusion (or exclusion) or formatting of one or more user interface elements provides the different types of designs for a user interface. Note that the different designs may include all or a portion of the same interface content (e.g., interface elements), and some designs may not include any of the same content. The computing system may monitor user interactions with the multiple different types of user interface designs. The computing system may generate a plurality of metrics associated with user interaction with the different designs.

The system may correlate the metrics with attributes of the users to determine groups of users. The system may generate sets of rules for assigning users to different groups. The system may use these groupings to provide customized user interfaces to the different groups of users.

Figure 10:
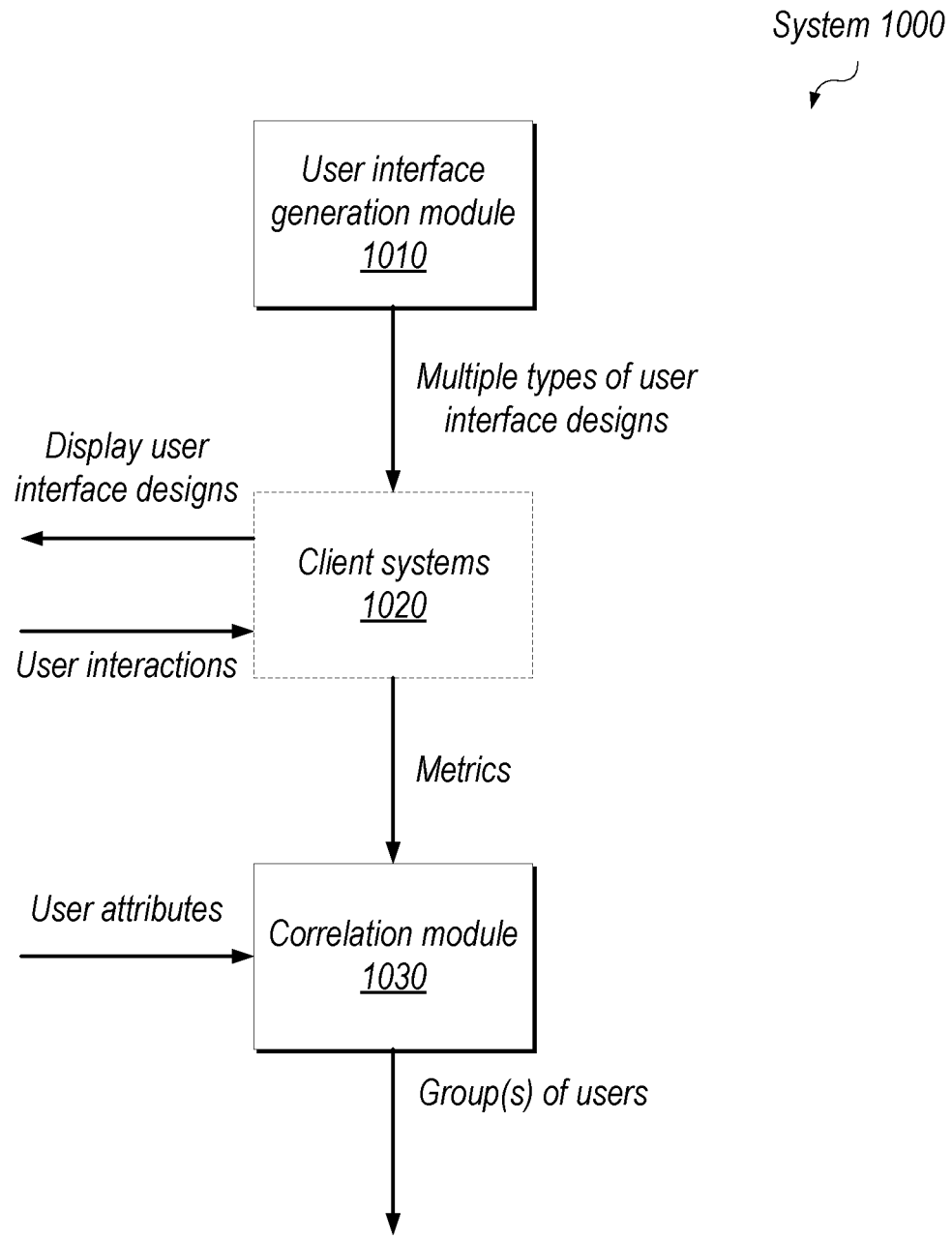
FIG. 10 is a block diagram illustrating a system for generating groups of users based on correlation data, according to some embodiments.

FIG. 10 is a block diagram illustrating a system for generating groups of users based on correlation data, according to some embodiments. In the illustrated embodiment, system 1000 includes user interface generation module 1010 and correlation module 1030, which communicate with client systems 1020.

User interface generation module 1010, in the illustrated embodiment, generates multiple design types for a user interface and sends the designs to client systems 1020. In some embodiments, user interface generation module 1010 uses one or more machine learning engines to generate user interface design types. Note that a particular machine learning engine may be trained and used to generate a given design type for a user interface. For iterative embodiments, a machine learning engine may be adjusted to generate variations of the given design type. FIGS. 2B and 4, described in detail above, display examples of different component-based designs that may be generated using one or more machine learning engines. These are examples of design variations that may be used to generate interaction metrics.

In some embodiments, human-in-the-loop techniques may be used in the context of machine learning implementations. FIG. 7, described in detail above, displays examples of machine learning modules that are trained based on user feedback. In embodiments where a human-in-the-loop machine learning model is used, an administrator or designer may provide instructions or feedback for user interface designs. Note that the iterative example discussed in detail below with reference to FIG. 12 may involve human-in-the-loop machine learning, where an administrator may guide one or more iterations of the automatic generation of user interface design types.

As used herein, the term "design type" refers to different user interfaces that use different formatting for one or more types of user interface elements. Note that design types may also show different subsets of available content, e.g., for displayed products. For example, a given user interface element in a first user interface design type may be displayed using a bold formatting, while the given user interface element in a second user interface design type may be displayed using a different color and size than the user interface element in the first user interface design type. As another example, a text element may be displayed in a first user interface design in italics but is not displayed in a second user interface design.

Client systems 1020, in the illustrated embodiment, display the different types of user interface designs generated by module 1010 to users associated with the client systems. In the illustrated embodiment, user interactions with the multiple different types of designs are recorded at client systems 1020, where the recorded interactions provide one or more metrics for the different design types. For example, the metrics may include one or more of the following: click-through rate, click rank, other selection activity, time spent on a portion of an interface, mouse pointer activity, touch data (e.g., speed intensity, etc.) for touchscreens, scrolling activity, etc. Click-through rate, for example, may be determined based on a comparison of the total number of users that click on a given user interface element to the total number of users that viewed the user interface. As another example, click rank may be determined based on the location of selected interface elements (e.g., in a list or other hierarchy). For example, if all users in a group of users click on an element that is displayed first in a list, the average click rank for that particular group of users is 1.

Correlation module 1030, in the illustrated embodiment, receives the metrics from client systems 1020 and user attributes for users of the client system 1020 (these attributes may be received from client systems 1020 or other sources such as an internal database, another server that maintains account information, etc.). Correlation module 1030 performs one or more correlation procedures based on the received metrics and attributes. In some embodiments, different attributes or different attribute values are associated with a given user at different times. For example, during a first year a user may have a salary between $90,000 and $100,000, but during another year the user's salary may be above $100,000. In this example, a salary attribute is associated with a user and the attribute has different values at two different times. Similarly, an attribute may be known for a user at one time but obsolete or unavailable at another time. Note that examples of user attributes are discussed in further detail below with reference to FIG. 11.

Correlation module 1030, in the illustrated embodiment, generates one or more group(s) of users based on the correlation data. Note that information specifying a group of users may specify actual identifiers for specific users in the group or may specify attribute rules used to classify users into groups. In some embodiments, correlation module 1030 assigns a user interface design type to a group of users based on the correlation.

As used herein, "correlation" is intended to be construed according to its well-understood meaning, which includes identifying a relationship between two or more datasets. In disclosed embodiments, a correlation may be determined between user attributes and metrics generated based on users interacting with different design types for one or more user interfaces. For example, a correlation procedure may generate results showing that users in a certain age range and geographic location prefer a first design type for a user interface over other design types for the user interface. In some embodiments, rule sets may be used to assign users to user groups based on correlation results.

In some embodiments, correlation module 1030 establishes criteria for assigning a user to a user group based on user attributes. Correlation module 1030 may determine a subset of available user attributes that are examined to determine if a user meets the criteria for being assigned to a user group. Different attributes may be used as inputs for different user group classifications. For example, one group may include criteria based on location and salary while another group may include criteria based on recent Internet activity, but not salary or location.

Figure 11:
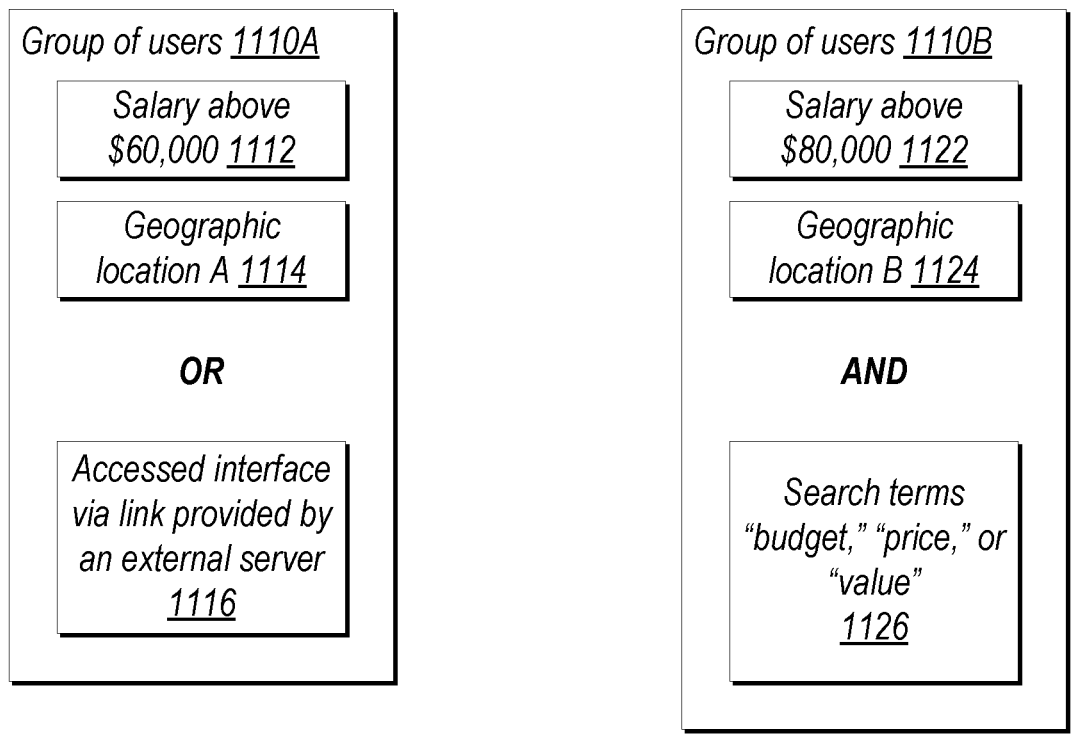
FIG. 11 is a block diagram illustrating example criteria for assigning users to user groups, according to some embodiments

FIG. 11 is a block diagram illustrating non-limiting example criteria for assigning users to user groups, according to some embodiments. In the illustrated embodiment, groups 1110A and 1110B include attribute criteria 1112, 1114, 1116, 1122, 1124, and 1126 for grouping users.

In the illustrated embodiment, user group 1110A has three different criteria for attributes of users that are included in the group. Specifically, the attribute values of a user must satisfy one of criteria 1112, 1114, and 1116 before the user may be added to group 1110A. In this example, if a user makes an annual salary above $60,000, lives in geographic location A, or accesses an interface via a link provided by an external server, then the user may be added to group 1110A.

Similarly, in the illustrated embodiment, user group 1110B includes attribute criteria 1122, 1124, and 1126, where a user's attribute values must meet all of the attribute criteria in order for the user to be added to the group. In this example, if a user makes an annual salary above $80,000, lives in geographic location B, and has entered search terms "budget," "price," or "value," then the user may be added to group 1110B. Note that while the "and" and "or" logical operators are used in the illustrated examples, any of various operators may be used to specify rules of various complexity for assigning users to groups, based on detected correlations. Non-limiting examples of user attributes include the following: salary, geographic location (e.g., France, USA, Australia, etc.), location type (e.g., urban, rural, etc.), visitor type (e.g., first-time visitor, visited within the last week, etc.), search terms, prior user activity (e.g., purchase history, browsing history, clicking history, etc.), search type (e.g., manually entered search, referred from external channel, etc.), etc.

Figure 12:
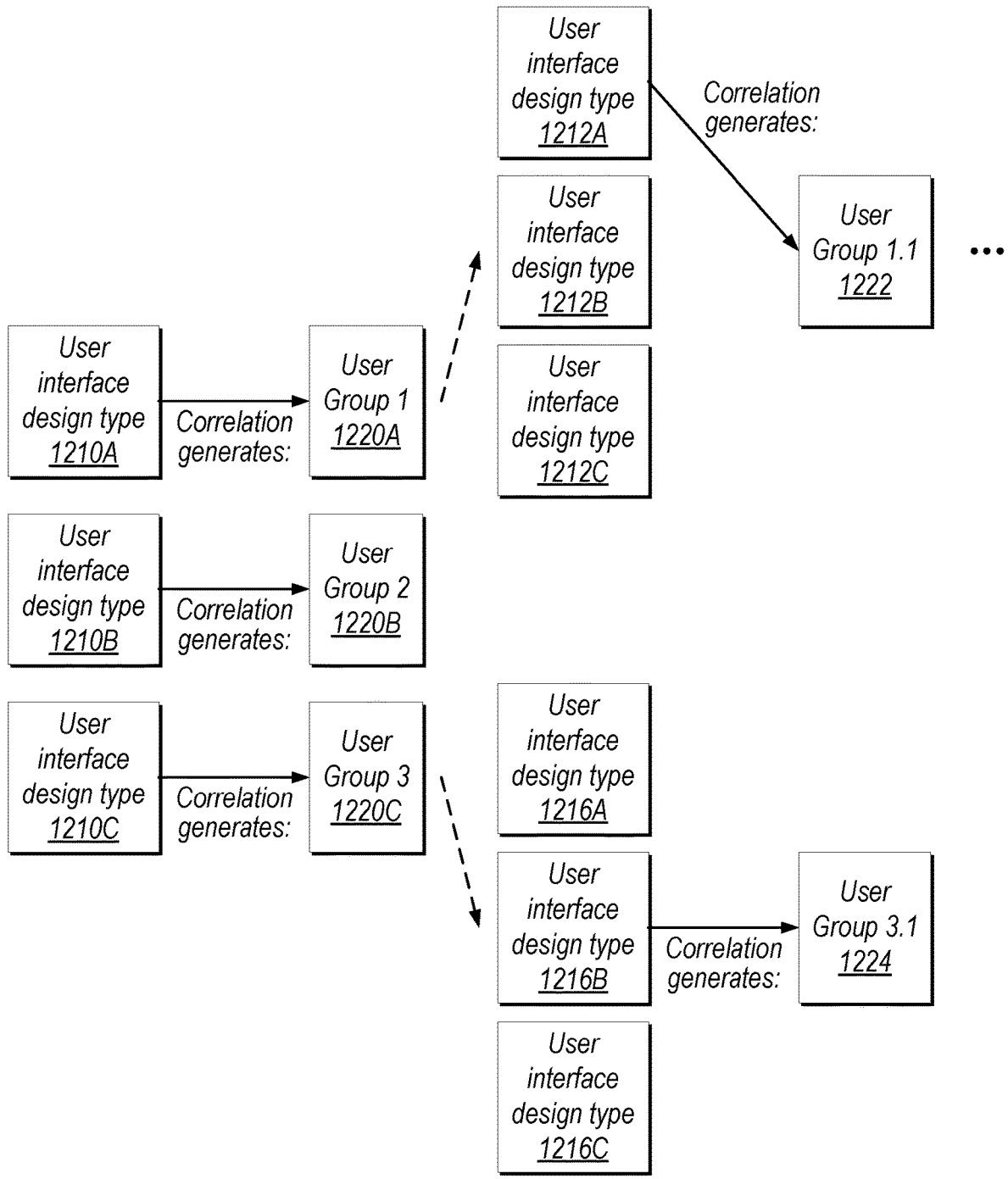
FIG. 12 is a block diagram illustrating example iterations of correlation procedures for various user interface design types, according to some embodiments.

Turning now to FIG. 12, a block diagram is shown illustrating multiple example iterations of correlation procedures for various user interface design types, according to some embodiments. In the illustrated embodiment, correlation procedures are iteratively performed for different user interface design types 1210A-1216C to generate groups of users 1220A-1224.

In some embodiments, a user interface generation module (e.g., module 1010) iteratively refines user interface design types and a correlation module (e.g., module 1030) may iteratively correlate user interactions with the iteratively refined design types and attributes of the users. In the illustrated example, based on user interactions with initial user interface design types 1210A-1210C, correlation procedures (such as those performed by correlation module 1030) generate user groups 1220A-1220C. Then, multiple different design types are generated for some of the user groups generated in the initial correlation. For example, design types 1212A-1212C are generated and displayed for users of user group 1 to further refine designs for this user group. As discussed above, a human-in-the-loop model may be used to iteratively generate different design types, such as design types 1212A-1212C. A user group may be further segmented based on interactions with these designs, e.g., to generate user group 1.1 as shown. In the illustrated example, correlation procedures performed based on user interaction with refined design types 1212A and 1216B generate user groups 1222 and 1224, respectively.

In some embodiments, user groups (e.g., groups 1220B and 1224) may meet one or more correlation thresholds and, therefore, no further iterations are performed. For example, no further designs are generated based on design types 1210B and 1216B. In some embodiments, however, even if a generated user group meets one or more correlation thresholds, further iterations of correlation procedures are performed. In some embodiments, user interface designs or user groups may be adjusted in an ongoing fashion based on user interaction.

In some embodiments, multiple different user groups may be generated based on interactions with a single user interface design type. For example, correlation procedures performed based on user interface design type 1216B may generate user group 3.1 and another user group 3.2 (not shown).

Example Method for Grouping Users

Figure 13:
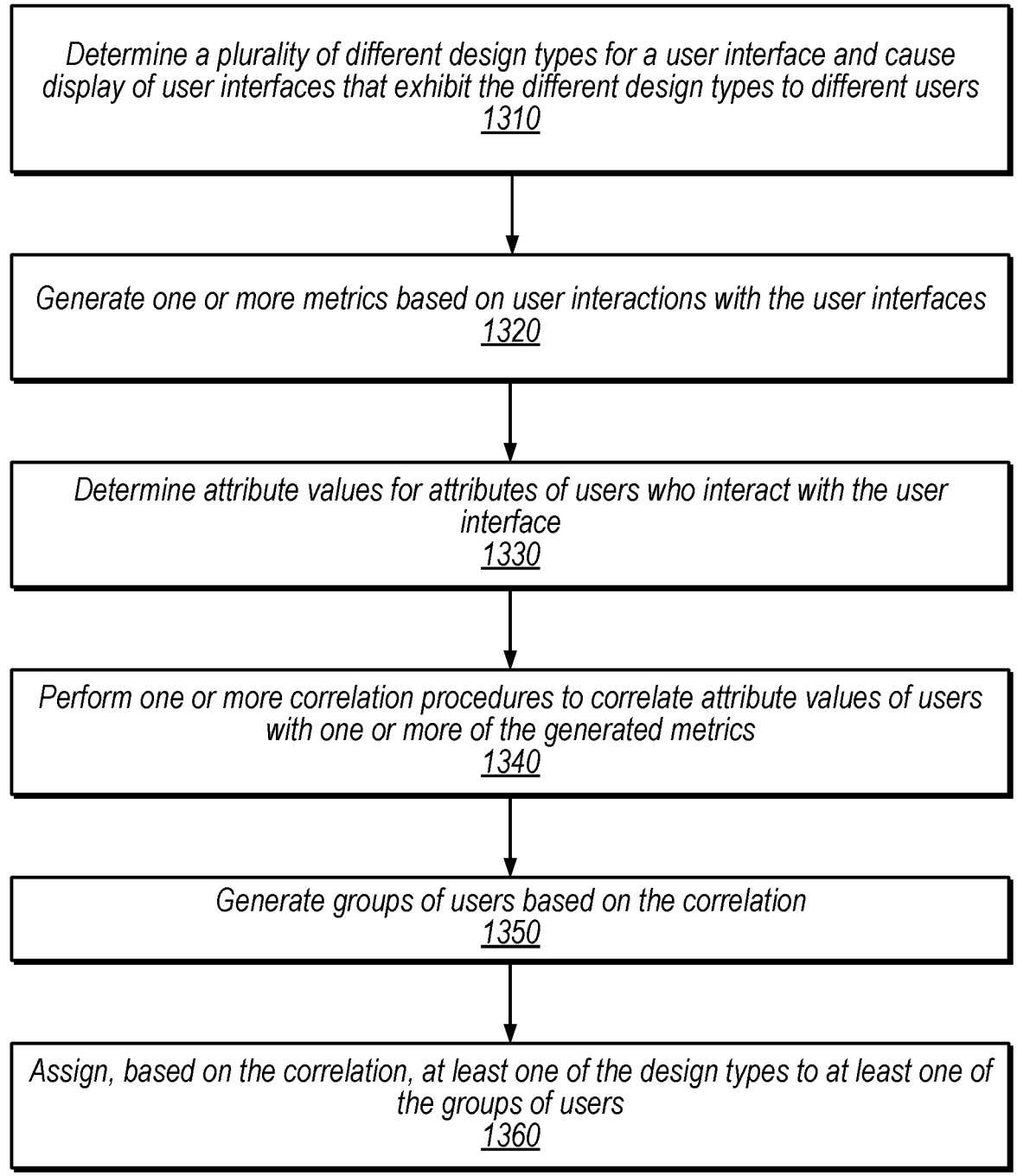
FIG. 13 is a flow diagram illustrating an example method for generating groups of users based on correlation data, according to some embodiments.

FIG. 13 is a flow diagram illustrating an example method for generating groups of users based on correlation data, according to some embodiments. The method shown in FIG. 13 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 1310, in the illustrated embodiment, a computing system determines a plurality of different design types for a user interface and causes display of user interfaces that exhibit the different design types to different users. Note that a given user may interact with multiple different design types. In some embodiments, a first user interface element is displayed in respective first and second user interfaces that exhibit different design types, where a format of the first user interface element is different for the first user interface than the second user interface. For example, for an image of a pair of shoes displayed in first and second user interfaces, the size of the image displayed in the first interface is larger than the size of the same image displayed in the second user interface, even where the dimensions of the first and second user interfaces are the same.

In some embodiments, a first type of user interface element is displayed in respective first and second user interfaces that exhibit different design types, where a format of the first type of user interface element is different for the first user interface than for the second user interface. For example, two different images stored using the same resolution may be displayed in first and second user interfaces. In this example, however, the image displayed in the first user interface may be shown using a smaller size that the image displayed in the second user interface. Similarly, a "star rating" type of element may be shown using different sizes or colors in different interface designs.

In some embodiments, a first user interface element is displayed in a first user interface that exhibits a first design type where the first user interface element is not displayed in a second user interface that exhibits a second design type. For example, one design type may include user ratings and another design type may not. In some embodiments, a plurality of different machine learning engines generate respective sets of the user interfaces that exhibit different design types. For example, a given machine learning engine may generate a set of user interfaces that exhibit a particular design type. In some embodiments, a machine learning engine is associated with a group of users, where the machine learning engine generates user interfaces that exhibit a design type assigned to the group of users. In some embodiments, different design types are generated using component-based techniques described above.

At 1320, the computing system generates one or more metrics based on user interactions with the user interfaces. In some embodiments, the one or more metrics include a click-through rate. In some embodiments, the one or more metrics include a click rank. In some embodiments, click rank may be determined for an ordered list or for other types of orderings (e.g., right to left in an interface, big to small font size, etc.). In some embodiments, metrics are generated and maintained based on a set of attributes associated with a given user interacting with a given user interface. Generally, data for users interacting with various user interfaces may be maintained in such a way that facilitates correlation of metrics with user attributes.

At 1330, the computing system determines values for attributes of users who interact with the user interface. In some embodiments, the attributes of users who interact with the user interface include attributes that indicate at least one of: a browsing history attribute, a purchase history attribute, a demographic information attribute, and a search term attribute. In some embodiments, user attributes include raw data, such as an explicit search term entered by a user (e.g., the term "cheap"). In some embodiments, user attributes are some determined characteristic of raw attribute data, such as information determined from one or more search terms entered by a user (e.g., "user has used budget conscious search terms").

At 1340 the computing system performs one or more correlation procedures to correlate attribute values of the users with one or more of the generated metrics. In some embodiments, the computing system iteratively performs the determining the plurality of different design types, the generating the one or more metrics, the determining the attribute values, and the performing the one or more correlation procedures until one or more correlation thresholds are met, as discussed in detail above with reference to FIG. 12.

At 1350 the computing system generates groups of users based on the correlation. In some embodiments, one or more users are included in multiple different generated groups of users at the same time.

At 1360 the computing system assigns, based on the correlation, at least one of the design types to at least one of the groups of users. In some embodiments, in response to receiving a request from a user in one of the generated groups of users, the computing system automatically generates the user interface that exhibits the at least one design type assigned to the group.

In some embodiments, determining a user interface design type for a user group may advantageously reduce the amount of time to display a user interface for a user (that is included in the group) relative to generating custom user interfaces for each individual user. Reducing the amount of time to display a user interface may in turn improve user interaction with the user interface (e.g., because the user is able to interact with the interface more quickly). Similarly, group-based custom interfaces may allow custom interfaces to be provided for users for which limited information is available (e.g., enough information to select a group, but not enough information for an individualized interface). In some embodiments, displaying a customized user interface to user groups may improve user interaction with the interface relative to non-customized user interfaces. While traditional techniques have focused on displayed content, disclosed embodiments also adjust interface formatting and design for different types of users.

User Interface Customization Across Communication Channels

In some embodiments, a computing system provides customized user interfaces based on user interactions with user interfaces on different communication channels. For example, user interaction with different advertisement designs may inform the use of those designs, or similar designs, for a website or other communication channels. Metrics tracked by one communication channel for a user interface design may be used to "fill in the gaps" for metrics tracked by other communication channels displaying a similar interface design. Different communication channels may have different tracking capabilities to measure user interaction. For example, some advertisements may generate only binary metrics (such as whether a particular advertisement was selected or not), while a website may allow gathering of multiple different types of metrics (e.g., selections, scrolling, mouse pointer movement, purchasing activity, profile information, cookie information, etc.). As another example, a user interface displayed on a smartphone may gather information for touch-based gestures that is different than touch-based information gathered by a smartwatch.

Figure 14:
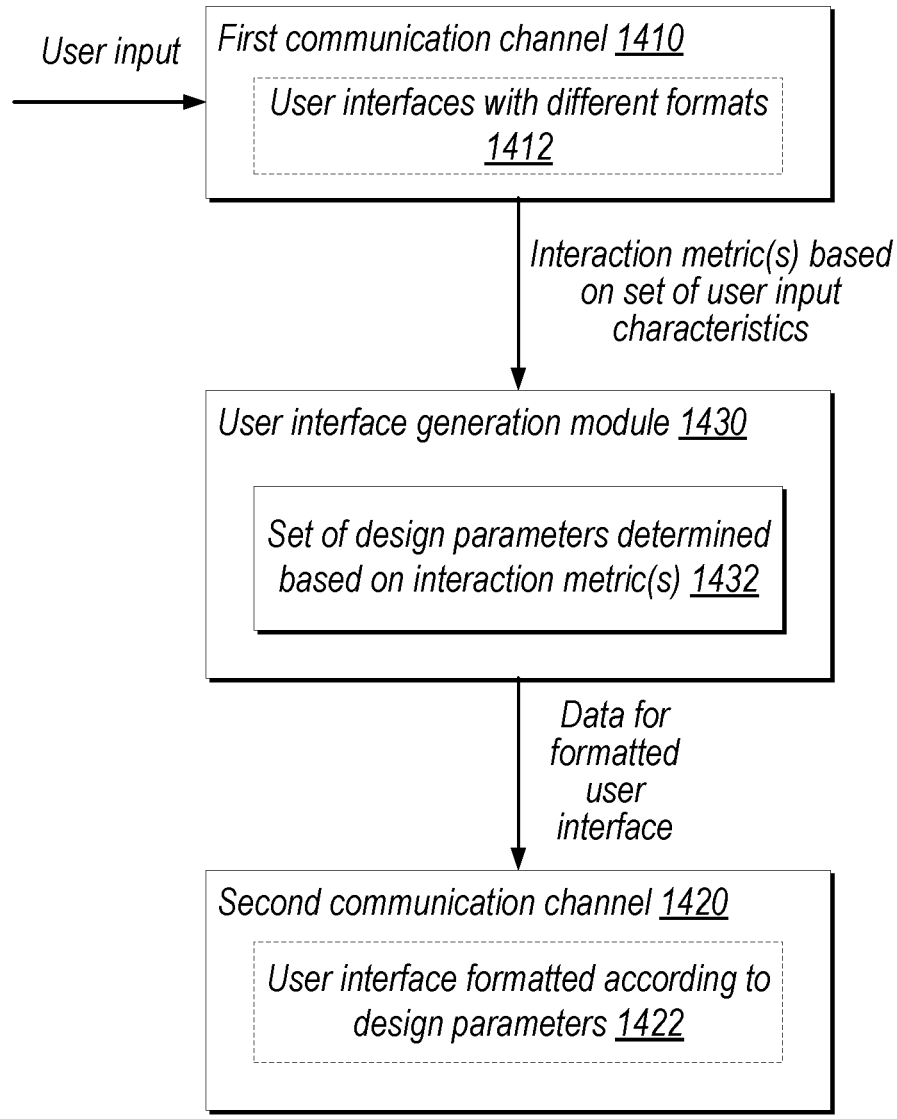
FIG. 14 is a block diagram illustrating an example system for generating customized user interfaces using metrics from across communication channels, according to some embodiments.

FIG. 14 is a block diagram illustrating an example system for generating customized user interfaces using metrics from across communication channels, according to some embodiments. In the illustrated embodiment, user interface generation module 1430 generates a customized user interface for display via second communication channel 1420 based on metrics determined from user interactions via first communication channel 1410.

First communication channel 1410, in the illustrated embodiment, receives user input from different users based on displaying user interfaces 1412 with different formats. In some embodiments, the different formats for the user interfaces may be different design types for a user interface, as discussed above with reference to FIGS. 10 and 12. Note that a given user may receive multiple different formats for a given interface or multiple interfaces with a given format, in certain situations. Based on tracking a set of user input characteristics (e.g., characteristics supported by the channel), first communication channel 1410 generates interaction metric(s). In some embodiments, the interactions metric(s) are for a single user's activity tracked via first communication channel 1410.

As used herein, the term "user input characteristic" refers to a measurable aspect of user interaction with an interface. Non-limiting examples of such characteristics include: selection activity (e.g., via a mouse, touchscreen, or verbal command), navigation activity (e.g., scrolling, mouse pointer movement, time spent on a portion of an interface, number of pages or interface portions viewed within a time interval), interaction with certain types of interface elements (e.g., elements that facilitate a purchase, elements that are highly ranked within the interface, etc.). Note that in various embodiments discussed herein where user input characteristics are considered, user attributes (e.g., demographics, profile information, etc.) may be considered in combination or in place of user input characteristics. Similar to tracking user input characteristics, different communication channels may support tracking of different user attributes.

As used herein, the term "communication channel" refers to an interactive medium used to display information to a user and receive user input. In some embodiments, different communication channels support tracking of different user input characteristics. Non-limiting examples of communication channels used to display user interfaces include one or more of the following: a webpage, a web application, a portion of a webpage (e.g., an advertisement or a related product recommendation), SMS communications, a social media platform, an email application, a voice call, a video call, etc. Note that different types of computing devices may utilize different communication channels for a given interface or similar interfaces, e.g., a smartphone may support tracking of different user input characteristics than a smartwatch or a personal computer.

User interface generation module 1430, in the illustrated embodiment, receives the interaction metric(s) from first communication channel 1410. Module 1430 determines a set of design parameters 1432 based on the interaction metric(s) and sends data for a formatted user interface to second communication channel 1420. The set of design parameters 1432 may be customized based on the metrics, e.g., to improve user interaction for a target user or user group. The data for the formatted user interface may include user interface code (e.g., in a form that is ready to be rendered and displayed) or may include parameters such as the set of design parameters 1432 that another module may use to generate user interface code. Note that content to be displayed via the formatted user interface may or may not be included in the data from user interface generation module 1430. In some embodiments, the content may be maintained on another computing system that formats the content according to the data for the formatted user interface.

Second communication channel 1420, in the illustrated embodiment, is used to display user interface 1422 that is formatted according to the set of design parameters. Note that the user interface 1422 may be displayed to different user(s) than the user interfaces 1412 or may be displayed to at least a portion of the same users.

Note that the second communication channel 1420 may support tracking of a different set of interaction metrics than channel 1410. In some embodiments, the system considers metrics from both channels in combination (and potentially in combination with metrics from additional channels not shown) to generate design parameters 1432.

Example User Grouping Based on Data From Multiple Channels

Figure 15:
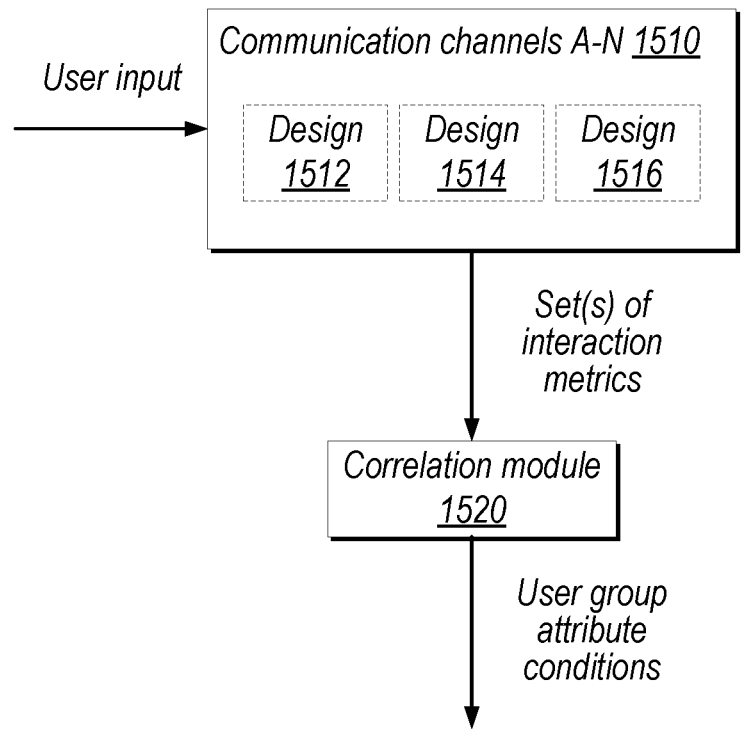
FIG. 15 is a block diagram illustrating user group segmentation based on interaction metrics from multiple communication channels, according to some embodiments.

FIG. 15 is a block diagram illustrating user group segmentation based on interaction metrics from multiple communication channels, according to some embodiments. In the illustrated embodiment, correlation module 1520 generates groups of users based on metrics generated by communication channels A-N 1510 (note that the disclosed techniques may be used for one communication channel or multiple communication channels).

Communication channels A-N 1510, in the illustrated embodiment, track user input for designs 1512-1516. In some embodiments, ones of the communication channels A-N 1510 may be used to display all or a portion of the different designs 1512-1516. In some embodiments, multiple designs are displayed on each of multiple channels to multiple users to generate a set of interaction metrics. In some embodiments, multiple designs may be displayed in parallel on a single user interface to a single user on a single communication channel. In these embodiments, the system may use user interaction with the multiple designs to generate metrics for another channel. In various embodiments, any of various appropriate combinations of designs, channels, and users may be implemented to generate sets of interaction metrics.

In some embodiments, each of communication channels A-N 1510 track a different (but potentially overlapping) set of user input characteristics and generate a set of metrics based on values of the different characteristics. Note that non-limiting examples of communication channels and user input characteristics are discussed above with reference to FIG. 14.

Correlation module 1520, in the illustrated embodiment, receives set(s) of interaction metrics from communication channels A-N 1510. Based on the set(s) of interaction metrics, correlation module 1520 determines user attribute conditions for assigning users to a user group. In some embodiments, correlation module 1520 accesses attributes of users interacting with communication channels A-N 1510 to determine user attribute conditions. In some embodiments, correlation module 1520 performs one or more correlation procedures to determine relationships between set(s) of interaction metrics and user attributes, as discussed above with reference to FIGS. 10-12. Speaking generally, any of the segmentation techniques discussed above with reference to FIGS. 10-12 may utilize cross-channel metrics, in some embodiments.

Example Iterative Cross-Channel Customization

Figure 16:
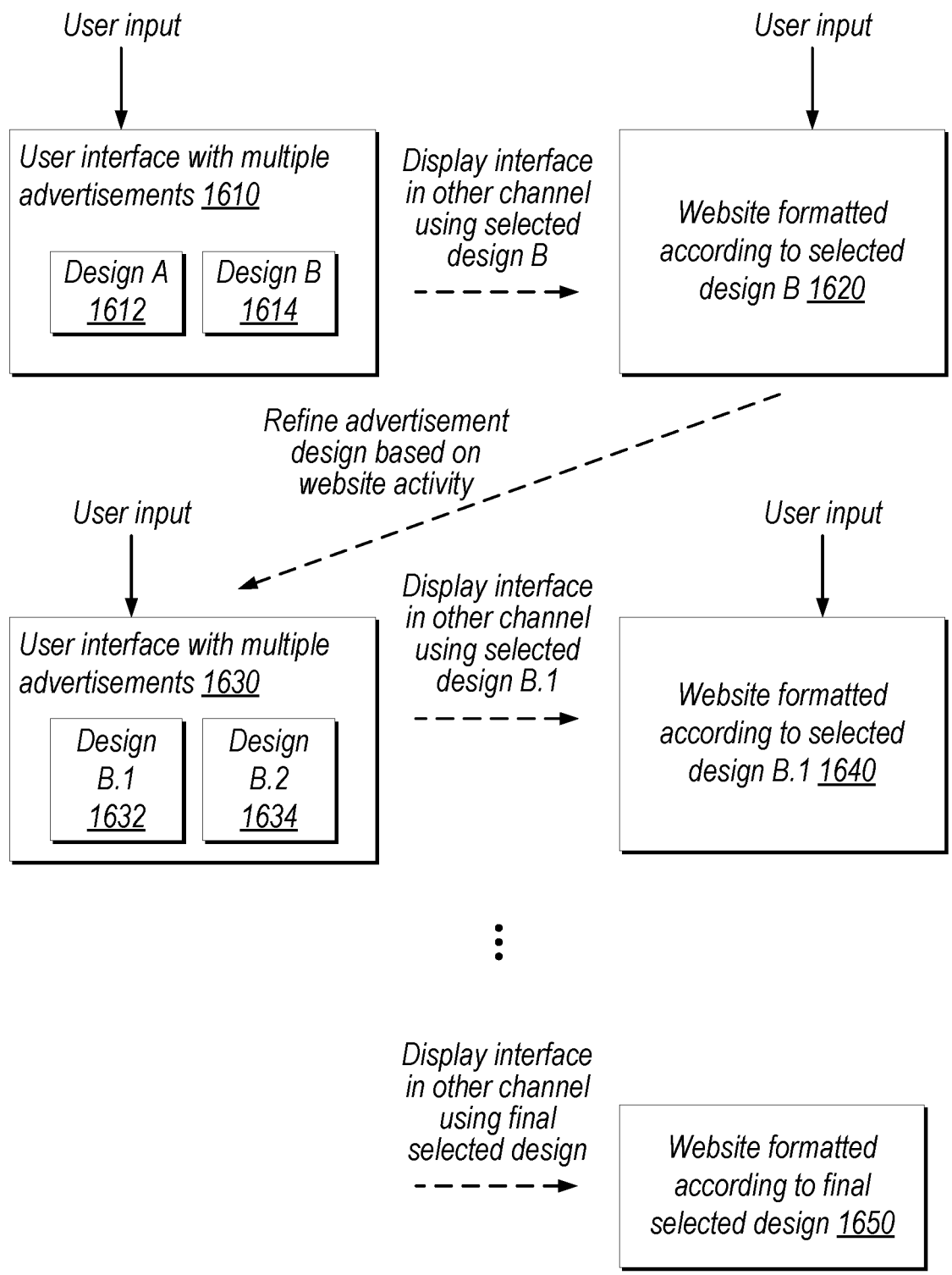
FIG. 16 is a block diagram illustrating example user interface refinement based on user input via another communication channel, according to some embodiments.

FIG. 16 is a block diagram illustrating example user interface refinement based on user input via another communication channel, according to some embodiments. In the illustrated embodiment, websites 1620 and 1640 are formatted according to user input tracked via user interfaces 1610 and 1630, respectively.

In the illustrated embodiment, user interface 1610 displays multiple different advertisement designs (design A 1612 and design B 1614). In some embodiments, advertisements allow tracking of a set of user input characteristics (e.g., whether a user selected a link in an advertisement, whether a user stopped or started a video displayed in an advertisement, whether a user muted audio from an advertisement, whether a user closed an advertisement, etc.). In the illustrated example, the advertisements displayed in user interface 1610 allow tracking of which of the designs a user selects to access website 1620. In the illustrated embodiment, website 1620 is formatted according to the selected design B 1614. In some embodiments, this may be a direct formatting technique in which the target website is formatted specifically to match the selected advertisement. In other embodiments, this formatting may be based on additional factors, e.g., other metrics for the same user or other users (e.g., in the same segment as the current user). Thus, in some situations, the target website may not be formatted to match the selected advertisement. Further, even in situations where the website is formatted to match a general style of a selected advertisement, there may be additional formatting parameters for the website that are not included for the advertisement or vice versa.

Website 1620, in the illustrated embodiment, tracks user activity. As discussed above, websites may generally support tracking of a larger number of user input characteristics than advertisements, but typically provide a smaller number of user data points relative to advertisements and may have a greater cost associated with poorly-formatted interfaces relative to advertisements. Based on user activity on website 1620, the system refines design B 1614 to generate two different advertisement designs 1632 and 1634.

In the illustrated embodiment, user interface 1630 displays multiple different refined advertisement designs (design B.1 1632 and design B.2 1634) and facilitates tracking of user input for the designs. In the illustrated embodiment, the user selects design B.1 and website 1640 is formatted accordingly. Then, website 1640 facilitates tracking of user input and the refinement process continues until a final design is selected.

Website 1650, in the illustrated embodiment, displays a user interface that is formatted according to the final selected design. Note that while a final design is shown in the illustrated example, in some embodiments refinement may continue indefinitely. In some embodiments, the system selects a design and stops iterating when one or more user interaction thresholds are met.

In some embodiments, different communication channels provide different quantities of user input data. Thus, cross-channel metrics may be leveraged from channels that support tracking of large amounts of data for other channels that support tracking of relatively smaller amounts of data. In some embodiments, combining metrics from multiple channels may be particularly useful, e.g., where a large number of user input characteristics are available on some channels, but those channels may have limited volume of tracked data relative to other channels.

In some embodiments, based on the quantity of user input data provided by a communication channel, different numbers of iterations are performed to refine a user interface. For example, if a first communication channel (e.g., advertisements displayed in user interface 1610) provides a high quantity of input data relative to other communication channels, fewer iterations of refinement may be performed for a user interface displayed via a second communication channel (e.g., website 1620).

In some embodiments, input data provided by different communication channels is associated with different costs. For example, a website that supports tracking of user input may be associated with a higher cost than an advertisement. The quantity of input data provided by the website, however, may be much greater than the quantity of input data provided by the advertisement.

In some embodiments, the refinement techniques discussed above may be implemented using a non-iterative procedure. For example, a website may be formatted based on user selection of an advertisement design, without further iterations of refinement for the website. In this example, the website may be formatted using the same format as the advertisement design.

In some embodiments, a user interface is displayed to a user via a second communication channel without the user providing input for a first communication channel. For example, a user interface displayed to a user via a second communication channel may be formatted according to interaction metrics generated based on user input characteristics from other users tracked via a first communication channel. As another example, a first user may enter a request via a website (e.g., website 1620) and the website may display a requested user interface that is formatted according to metrics generated based on user input characteristics from other users. For example, the user input characteristics from other users may be tracked using one or more advertisements (e.g., advertisements displays in user interface 1610) where the first user does not interact with the one or more advertisements.

Example Method for Using Cross-Channel Metrics

FIG. 17 is a flow diagram illustrating an example method for generating customized user interfaces based on interaction metrics from another communication channel, according to some embodiments. The method shown in FIG. 17 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 1710, in the illustrated embodiment, a computing system generates one or more interaction metrics, based on a first set of user input characteristics for user interaction with multiple different user interface formats via a first communication channel. In some embodiments, the first communication channel supports tracking of the first set of user input characteristics.

At 1720, the computing system determines, based on the one or more interaction metrics, a set of design parameters for formatting of a user interface to be displayed via a second communication channel, where the second communication channel supports tracking of a second set of user input characteristics.

In some embodiments, the system causes display of the formatted user interface via the second communication channel. In some embodiments, the first communication channel is an online advertisement and the first set of user input characteristics includes link selection. For example, a user may tap a link associated with an advertisement displayed via their smart phone, where the link may allow the user to access a website. In some embodiments, the second communication channel is a website and the second set of user input characteristics includes selection activity, navigation activity, and interaction with different types of interface elements. For example, navigation activity may include scrolling or mouse pointer hovering activity of a user interacting with a website.

In some embodiments, the computing system performs one or more correlation procedures based on the generated one or more interaction metrics and attributes of the users interacting with the multiple different user interface formats via the first communication channel. In some embodiments, the computing system assigns a user to a user group based on the correlation, where the determining is based on the assigned user group. In some embodiments, the computing system generates attribute conditions for one or more user groups, where users may be added to a particular group if they meet one or more of the attribute conditions for the particular group.

In some embodiments, the computing system iteratively performs the generating the one or more interaction metrics and the determining the set of design parameters multiple times, where the iteratively generating includes modifying at least a portion of the different user interface formats for each iteration. In some embodiments, the modifying is based on user interaction with the user interface displayed via the second communication channel. A non-limiting example of iterative modification of at least a portion of different user interface formats is discussed above with reference to FIG. 16.

In some embodiments, the computing system uses the set of design parameters to format one or more other user interfaces for a particular user associated with the user interface to be displayed via the second communication channel, where the one or more other user interfaces are displayed via one or more other communication channels. For example, the computing system may generate a user interface formatted according to a set of design parameters for a given user and display the formatted user interface via an advertisement, an email, and a social media platform for the given user. In some embodiments, the one or more interaction metrics are generated based on sets of user input characteristics for a first user interacting with multiple user interface formats via multiple communication channels, where the multiple communication channels track different sets of user input characteristics. For example, the computing system may generate interaction metrics based on user input characteristics tracked by both an web application and a web page displaying the same (or different) user interface designs.

In some embodiments, the one or more interaction metrics include a first interaction metric that indicates user selection of one of the different user interface formats, where multiple ones of the different user interface formats are displayed at the same time via a same interface on the first communication channel. For example, a website may include a user interface displaying multiple advertisement designs at the same time, where a user selects one of the multiple designs. In some embodiments, the set of design parameters corresponds to the selected user interface format. For example, a user interface may be formatted based on the user interface format selected by the user or may display the selected format.

In some embodiments, collecting user input data across multiple communication channels may advantageously provide user interaction information from one channel that is not available from another channel (e.g., where different communication channels support tracking of different user input characteristics). In some embodiments, providing a customized user interface across multiple communication channels for a user (e.g., a cohesive user experience) may improve various performance metrics such as user satisfaction, productivity, sales, time spent performing a procedure, etc.

Overview of Example Emphasis Techniques Based on Predicted User Intent

In some embodiments, a user interface generator module emphasizes different user interface elements in different designs for a user interface, for example, based on predicted user intent. As one example, one user may enter the search phrase "good looking shoes," and receive results where images of returned results are emphasized relative to other interface elements. Similarly, another user may enter the search phrase "budget shoes," and receive results with an element displaying price data for returned results emphasized relative to other interface elements. Any of the various user attributes discussed herein may be used to predict user intent, in various embodiments.

In some embodiments, both content and formatting of a user interface may be changed to emphasize different portions of the content. For example, a star rating may be displayed in one user interface, but is not displayed in another user interface. The format of a user interface may be based on various parameters, including one or more of the following: font, location within the interface, color, size, opacity, resolution, decoration (which may include underlining, strikethrough, italic, bold, border, shadow, or background color, for example), etc. For example, the color and boldness of a specific text element may be different for two user interfaces.

Figure 18:
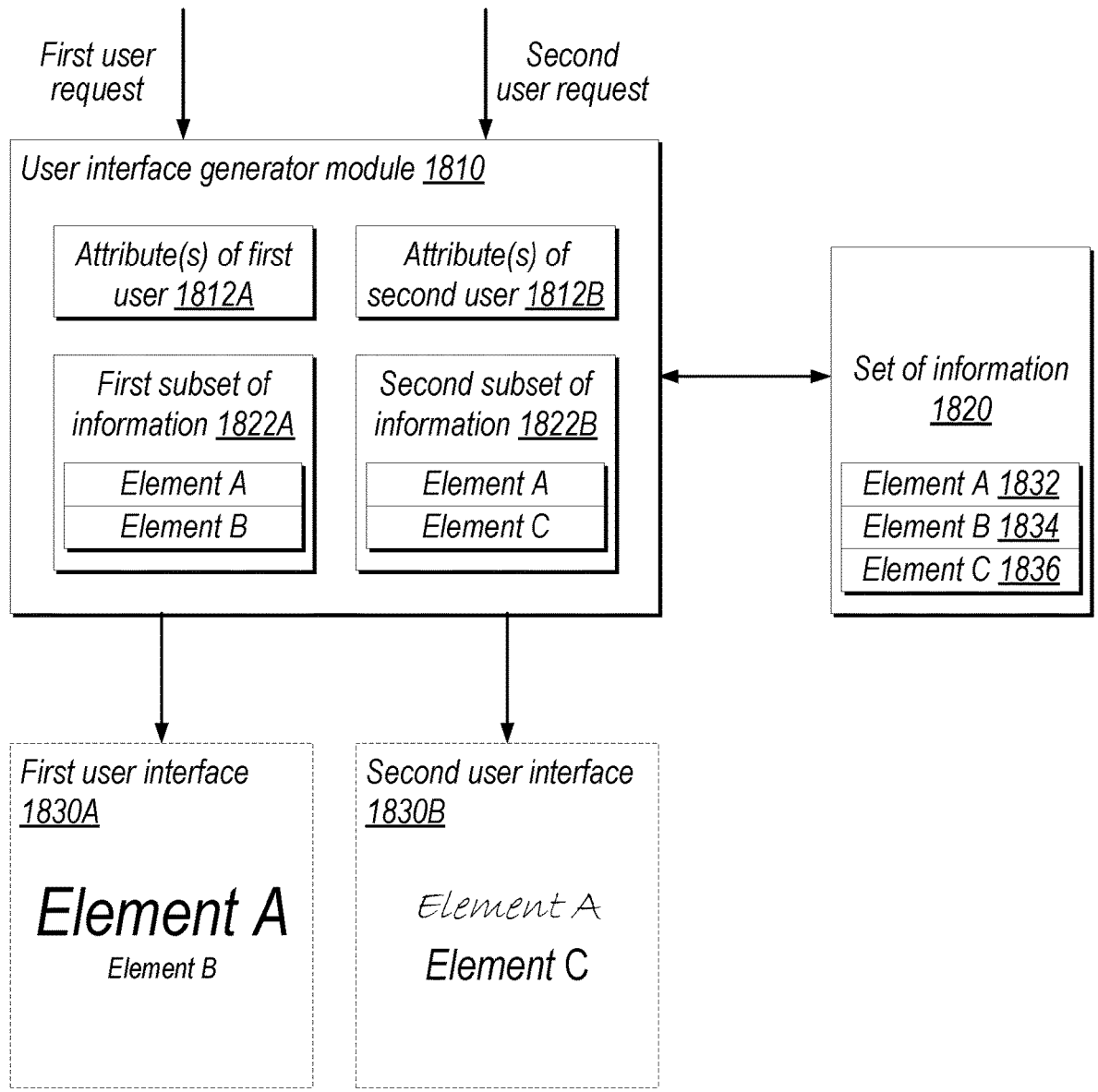
FIG. 18 is a block diagram illustrating an example user interface generator module for generating customized user interfaces for different users based on user attributes, according to some embodiments.

FIG. 18 is a block diagram illustrating an example system for generating customized user interfaces for different users based on user attributes, according to some embodiments. In the illustrated embodiment, user interface generator module 1810 accesses a set of information 1820, which may include content used to generate different user interfaces 1830A and 1830B for different user requests.

User interface generator module 1810, in the illustrated embodiment, receives separate requests from first and second users. Module 1810 accesses, for the requests, a set of information 1820 that includes data for user interface elements A-C 1832-1836. In some embodiments, a set of information may be associated with a given product, item, object, service, etc. For a user query, for the example, the set of information may be stored in a data structure for a product that matches the query. In some embodiments, all or a portion of a set of information (e.g., set of information 1820) may be accessed for a request. Note that elements 1832-1836 may be any of various types of user interface elements, including the following non-limiting examples: text, images, links, video, etc. As one example, element A 1832 may be a text element indicating a price associated with a given product, element B 1834 may be an image of the product, and element C 1836 may be a description of the product (e.g., "Men's running shoes"). A fourth element (not shown) may be a user rating for the product (e.g., 4 out of 5 stars).

Module 1810 accesses attribute(s) 1812A of the first user and attribute(s) 1812B of the second user for the respective requests. Note that module 1810 may use attributes(s) 1812A and 1812B to predict the intent of the first user and may select content or formatting for the content based on the predicted intent. Consider an example in which the first user has an attribute value which indicates that the user previously entered the search phrase "high quality hat." In this example, based on the attribute value, module 1810 may predict that the first user is interested in or intends to purchase a hat with high customer ratings relative to ratings for other hats and may format user interfaces displayed to the first user accordingly (e.g., to emphasize rating information).

In some embodiments, user attributes used to determine subsets or format user interfaces may be dynamically determined (e.g., based on user activity in a current session) or pre-determined (e.g., based on previously-determined user demographics or profile information). For example, a user may have demographic attributes indicating an annual income below $40,000, residence in a rural area, and use of the search term "budget." In this example, based on the demographic information (salary and location) and the dynamic information from the current session (search term), module 1810 may predict that the user is interested in a price associated with requested information and formats price information accordingly. Specifically, module 1810 may format the price of a product displayed in the user interface such that values of one or more formatting parameters for the price are associated with greater emphasis than the values of formatting parameters for other content displayed in the user interface.

Note that FIG. 11 provides examples of user attributes that may be used to segment users into groups. In some embodiments, all or a portion of these attributes, or additional attributes may be considered in various combinations when generating different user interface designs with different emphasis.

Module 1810 determines first and second subsets 1822A and 1822B of the set of information 1820, based on the attribute(s) 1812A of the first user and attribute(s) 1812B of the second user. In the illustrated embodiment, the first subset 1822A includes data for elements A and B, and the second subset 1822B includes data for elements A and C. Similarly, based on attribute(s) 1812A and 1812B, module 1810 determines a format of elements 1832-1836 for different user interfaces. In the illustrated embodiment, formats of elements 1832-1836 are shown in two different user interfaces 1830A and 1830B. In the illustrated example, element A is displayed using a different font, in bold, and larger in interface 1830A relative to interface 1830B. Further, interface 1830A displays element B but interface 1830B does not. Thus, emphasis of certain user interface elements is achieved by adjusting both formatting and content of a given interface, in some embodiments.

In some embodiments, attribute(s) 1812A and 1812B that are used to determine subsets of information and formatting of the subsets for user interfaces are stored externally to module 1810 on a separate server.

As used herein, the term "subset" refers to a portion that is less than the entirety of a set of information. For example, if a set of information includes data fields A, B, and C, a subset of the set of information may include fields A and B, or fields A, B, and a portion of field C. In some embodiments, a system may retrieve and display the entirety of a set of information for a given user request rather than a subset of the set of information.

In some embodiments, different formatting may be used for the same type of user interface element even in situations where different interfaces display different product information. For example, if one user searches for shoes and another user searches for hats, the underlying data may be completely different, but a given type of element (e.g., star rating, price, etc.) may be formatted differently for the different interfaces if the interfaces have different styles (or formatted similarly, if the same style is used for both users). In the illustrated example of FIG. 31, different interfaces include one or more of the same types of interface elements displaying the same information (for a product) with different formatting.

Note that the disclosed techniques for emphasizing certain types of interface elements may be used in combination with the user segmentation techniques discussed above. For example, user intent may be predicted at least in part based on a user group to which the user is assigned.

Example Customized User Interfaces

FIG. 19 is a block diagram illustrating two example customized user interfaces, according to some embodiments. In the illustrated embodiment, user interfaces 1912A and 1912B display different subsets, with different formatting, of a set of information for three pairs of shoes.

In the illustrated embodiment, user interface 1912A displays, for each shoe, a subset of that shoe's set of information that includes price, image, and description. Similarly, user interface 1912B displays, for each shoe, a second subset of that shoe's set of information that includes image and star rating. Note that the sets of information for each shoe may include price, image, description (e.g., men's hiking boot, men's work boot, and men's waterproof boot), and star rating, where user interfaces 1912A and 1912B display different subsets of the set of information for each shoe.

In the illustrated example, user interfaces 1912 vary in both content and formatting of the content. For example, user interface 1912B displays a subset of information with less elements than the subset of information displayed in user interface 1912A. Note that user interface 1912B does not display a price and description for shoes A, B, and C, but displays an image of each shoe that is larger than the images displayed in user interface 1912A. Therefore, user interface 1912B may be said to emphasize the appearance of each shoe. Note that, in some embodiments, a user interface system may be configured to vary only content or only formatting for different user interfaces. The disclosed examples with differences in both content and formatting are included for purposes of illustration but are not intended to limit the scope of the present disclosure.

In some embodiments, emphasis of user interface elements is determined based on user attributes, such as those discussed above with reference to FIG. 11. For example, a user interface similar to user interface 1912B may be displayed to a user that has attribute values associated with an interest in quality. Similarly, a user that has attribute values associated with an interest in price may be shown a user interface similar to user interface 1912A.

Note that the components shown in FIG. 4 provide examples of formatting (e.g., arrangement, size, etc.) that may be used to emphasize user interface elements (e.g., image, link, text). In addition, FIG. 2B shows an example user interface with different formatting for elements within various components. In various embodiments, component-based techniques may be used to adjust formatting for emphasis purposes.

Example Method for User Interface Customization

Figure 20:
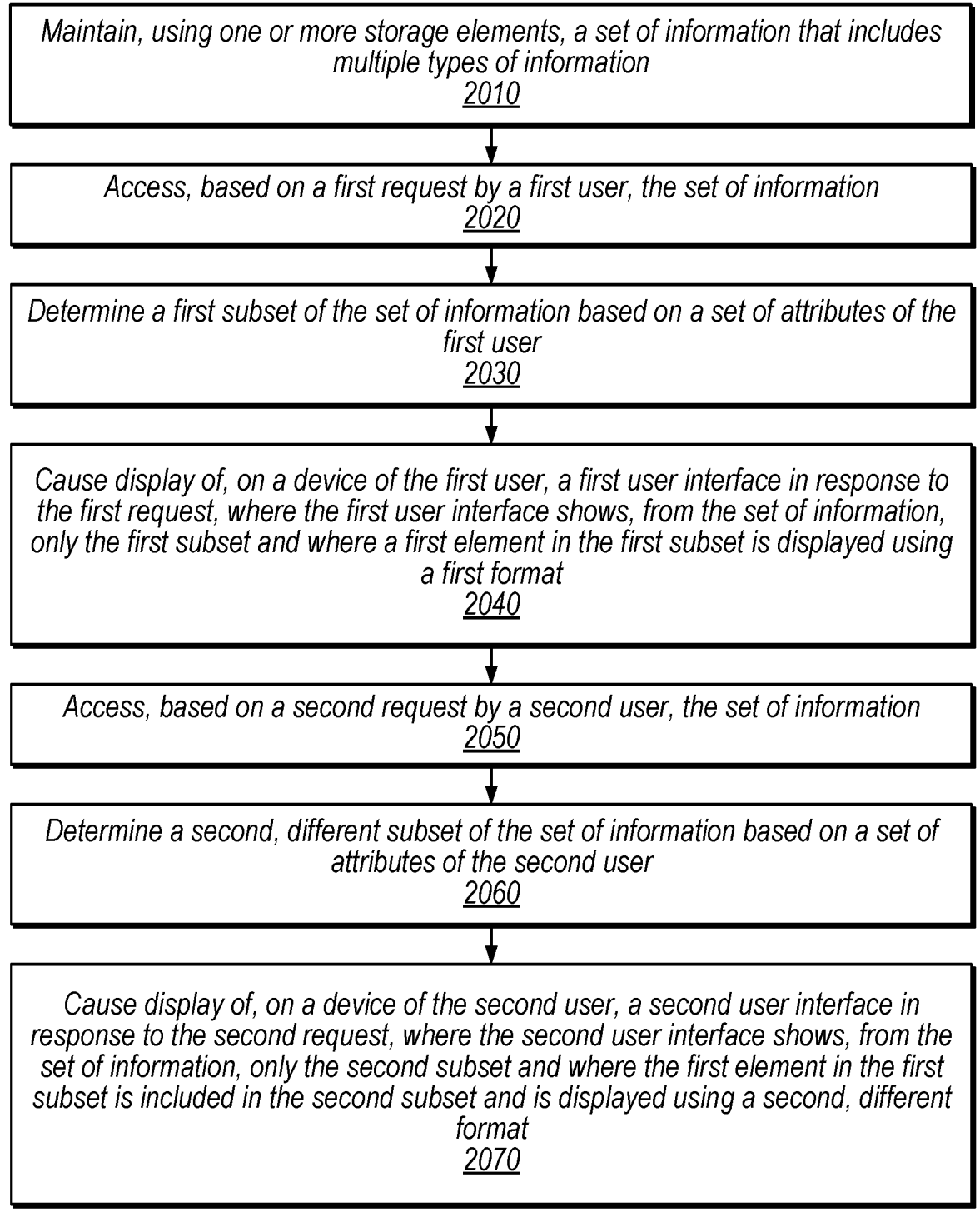
FIG. 20 is a flow diagram illustrating an example method for generating different user interfaces using different formatting, according to some embodiments.

FIG. 20 is a flow diagram illustrating an example method for generating different user interfaces using different formatting, according to some embodiments. The method shown in FIG. 20 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 2010, in the illustrated embodiment, a computing system maintains, using one or more storage elements, a set of information that includes multiple types of information.

At 2020 the computing system accesses, based on a first request by a first user, the set of information.

At 2030 the computing system determines a first subset of the set of information based on a set of attributes of the first user. In some embodiments, the set of attributes of the first user includes a communication channel attribute that is based on a communication channel used by the first user to submit the first request. For example, the user may use a social media platform, text messaging, email, a website, a web application, etc. to enter a request.

In some embodiments, the set of attributes of the first user includes one or more attribute values associated with an interest in appearance. In some embodiments, the set of attributes of the first user includes attribute values associated with an interest in quality. In some embodiments, the set of attributes of the second user includes attribute values associated with interest in price. In some embodiments the set of attributes of the first user includes a search term attribute that is based on one or more search terms entered by the first user. In some embodiments, the computing system generates the first user interface and the second user interface using one or more machine learning engines.

At 2040 the computing system causes display of, on a device of the first user, a first user interface in response to the first request, where the first user interface shows, from the set of information, only the first subset and where a first element in the first subset is displayed using a first format. In some embodiments, values of one or more formatting parameters for the first element in the first user interface are associated with greater emphasis than values of one or more formatting parameters for the first element in the second user interface. For example, a 24 point value for a font sizing parameter may be associated with greater emphasis than a 12 point value. In some embodiments, the format of the first element in the first user interface has a different value than the format of the first element in the second user interface for at least one of the following parameters: size, font, color, location within user interface, opacity, or resolution.

At 2050 the computing system accesses, based on a second request by a second user, the set of information.

At 2060 the computing system determines a second, different subset of the set of information based on a set of attributes of the second user.

At 2070 the computing system causes display of, on a device of the second user, a second user interface in response to the second request, where the second user interface shows, from the set of information, only the second subset and where the first element in the first subset is included in the second subset and is displayed using a second, different format.

In some embodiments, the computing system generates user group criteria by correlating attributes of users with metrics generated based on user interaction with multiple different user interface design types. In some embodiments, the computing system assigns the first user to a generated user group based on the set of attributes for the first user meeting user group criteria for the generated user group. In some embodiments, the determining the first subset of the set of information is based on the assigned user group. For example, if the user group contains users with attribute values that are associated with an interest in appearance, the first subset of the set of information may include an image element.

In some embodiments, custom emphasis of one or more elements in a user interface displayed to a given user may advantageously improve user interactions with the interface relative to traditional techniques. In some embodiments, emphasizing elements in a user interface may reduce user confusion when interacting with the interface, which in turn may reduce the number of actions (e.g., clicks) that the user takes before achieving a desired goal.

Example Computing Device

Figure 21:
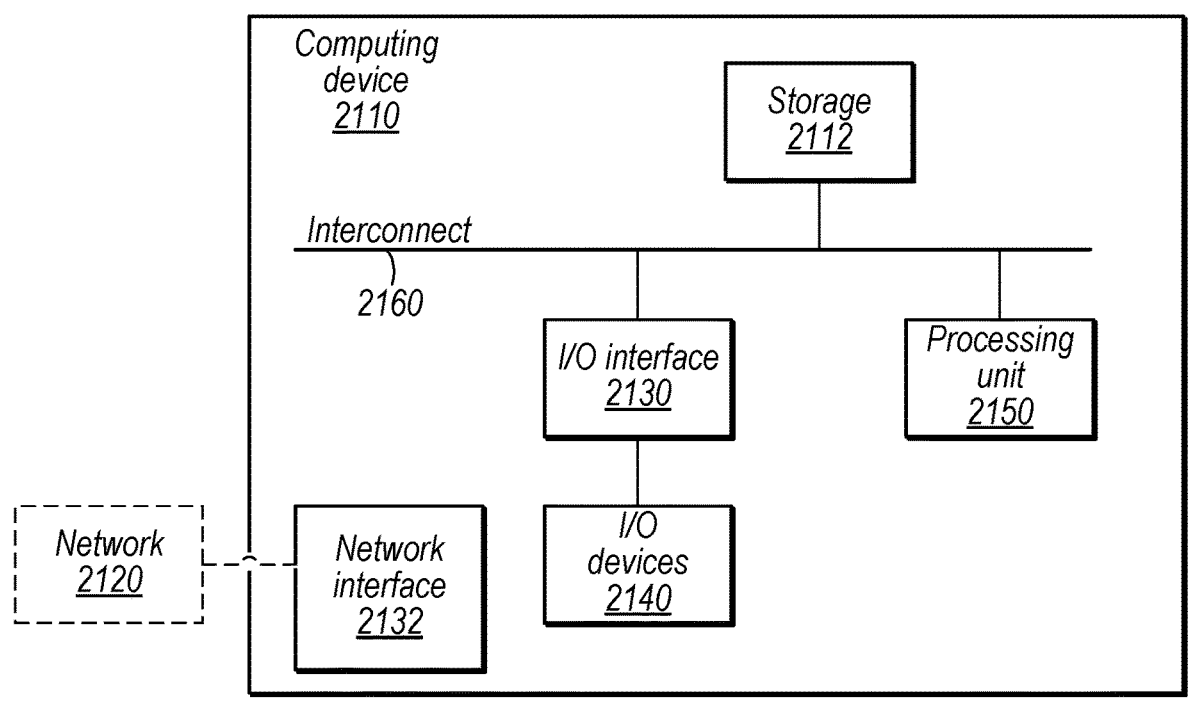
FIG. 21 is a block diagram illustrating an example computing device, according to some embodiments.

Turning now to FIG. 21, a block diagram of a computing device (which may also be referred to as a computing system) 2110 is depicted, according to some embodiments. Computing device 2110 may be used to implement various portions of this disclosure. Computing device 2110 is one example of a device that may be used as a mobile device, a server computer system, a client computer system, or any other computing system implementing portions of this disclosure.

Computing device 2110 may be any suitable type of device, including, but not limited to, a personal computer system, desktop computer, laptop or notebook computer, mobile phone, mainframe computer system, web server, workstation, or network computer. As shown, computing device 2110 includes processing unit 2150, storage subsystem 2112, and input/output (I/O) interface 2130 coupled via interconnect 2160 (e.g., a system bus). I/O interface 2130 may be coupled to one or more I/O devices 2140. Computing device 2110 further includes network interface 2132, which may be coupled to network 2120 for communications with, for example, other computing devices.

Processing unit 2150 includes one or more processors, and in some embodiments, includes one or more coprocessor units. In some embodiments, multiple instances of processing unit 2150 may be coupled to interconnect 2160. Processing unit 2150 (or each processor within processing unit 2150) may contain a cache or other form of on-board memory. In some embodiments, processing unit 2150 may be implemented as a general-purpose processing unit, and in other embodiments it may be implemented as a special purpose processing unit (e.g., an ASIC). In general, computing device 2110 is not limited to any particular type of processing unit or processor subsystem.

As used herein, the terms "processing unit" or "processing element" refer to circuitry configured to perform operations or to a memory having program instructions stored therein that are executable by one or more processors to perform operations. Accordingly, a processing unit may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A processing unit may also be implemented in programmable hardware devices such as field programmable gate arrays, programmable array logic, programmable logic devices, or the like. A processing unit may also be configured to execute program instructions or computer instructions from any suitable form of non-transitory computer-readable media to perform specified operations.

Storage subsystem 2112 is usable by processing unit 2150 (e.g., to store instructions executable by and data used by processing unit 2150). Storage subsystem 2112 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 2112 may consist solely of volatile memory in some embodiments. Storage subsystem 2112 may store program instructions executable by computing device 2110 using processing unit 2150, including program instructions executable to cause computing device 2110 to implement the various techniques disclosed herein.

I/O interface 2130 may represent one or more interfaces and may be any of various types of interfaces configured to couple to and communicate with other devices, according to various embodiments. In some embodiments, I/O interface 2130 is a bridge chip from a front-side to one or more back-side buses. I/O interface 2130 may be coupled to one or more I/O devices 2140 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

It is noted that the computing device of FIG. 21 is one embodiment for demonstrating disclosed concepts. In other embodiments, various aspects of the computing device may be different. For example, in some embodiments, additional components, or multiple instances of the illustrated components may be included.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   maintaining, using one or more storage elements for multiple items of a plurality of items, a set of information that includes multiple fields for multiple types of information;
   selecting, by a computing system from the plurality of items, a first set of items based on a single text search query by a first user and a second set of items based on a single text search query by a second user;
   ranking the selected first set of items for display in a first user interface and the selected second set of items for display in a second user interface;
   determining, for two or more of the first set of items, a first subset of item fields based on a set of attributes of the first user, including a communication channel attribute that is based on a current communication channel used by the first user to submit the single text search query and one or more prior communication channels used by the first user, wherein the current communication channel and the one or more prior communication channels provide an interactive medium for displaying information and receiving user input;
   determining, for two or more of the second set of items, a second, different subset of item fields based on a set of attributes of the second user;
   causing display of, on a device of the first user, the first user interface in response to the single text search query by the first user and prior to receiving additional input from the first user, wherein the first user interface shows the ranked first set of items including, from the set of information, only the first subset of item fields for the two or more of the first set of items; and
   causing display of, on a device of the second user, the second user interface in response to the single text search query by the second user and prior to receiving additional input from the second user, wherein the second user interface shows the ranked second set of items including, from the set of information, only the second subset of item fields for the two or more of the second set of items.

2. The method of claim 1, wherein values of one or more formatting parameters for a first field included in the first subset and displayed in the first user interface are associated with greater emphasis than values of one or more formatting parameters for the first field included in the second subset and displayed in the second user interface.

3. The method of claim 1, wherein the set of attributes of the first user further includes a search term attribute that is based on one or more search terms entered by the first user.

4. The method of claim 1, further comprising:
   generating user group criteria by correlating attributes of users with metrics generated based on user interaction with multiple different user interface design types; and
   assigning the first user to a generated user group based on the set of attributes for the first user meeting user group criteria for the generated user group;
   wherein the determining the first subset of the set of information is based on the assigned user group.

5. The method of claim 1, wherein a first field in the first user interface is displayed differently in the first user interface than the second user interface based on one or more differences in: font style, size, color, location within user interface, opacity, decoration, or resolution.

6. The method of claim 1, further comprising:
generating the first user interface and the second user interface using one or more machine learning engines.

7. The method of claim 1, wherein the set of attributes of the first user includes one or more attribute values associated with an interest in appearance.

8. The method of claim 7, wherein the set of attributes of the second user includes attribute values associated with interest in price.

9. The method of claim 1, wherein a first field in the first subset is displayed using a first format, wherein the first field in the first subset is also included in the second subset and is displayed using a second, different format, wherein the first format represents the first field using a first font style and wherein the second, different format represents the first field using a second, different font style.

10. The method of claim 9, wherein the set of attributes of the first user includes attribute values associated with an interest in quality.

11. A non-transitory computer-readable medium having instructions stored thereon that are capable of execution by a computing device to perform operations comprising:
maintaining, using one or more storage elements for multiple items of a plurality of items, a respective set of information that includes multiple fields for multiple types of information;
selecting, by a computing system from the plurality of items, a first set of items of the plurality of items based on a single text search query by a first user and a second set of items based on a single text search query by a second user;
ranking the first set of items for display in a first user interface and the second set of items for display in a second user interface;
determining, for two or more of the first set of items, a first subset of item fields based on a set of attributes of the first user, including a communication channel attribute that is based on a current communication channel used by the first user to submit the single text search query and one or more prior communication channels used by the first user, wherein the current communication channel and the one or more prior communication channels provide an interactive medium for displaying information and receiving user input;
determining, for two or more of the second set of items, a second, different subset of item fields based on a set of attributes of the second user;
causing display of, on a device of the first user, the first user interface in response to the single text search query by the first user and prior to receiving additional input from the first user, wherein the first user interface shows the ranked first set of items including, from the set of information, only the first subset of item fields for the two or more of the first set of items; and
causing display of, on a device of the second user, the second user interface in response to the single text search query by the second user and prior to receiving additional input from the first user, wherein the second user interface shows the ranked second set of items including, from the set of information, only the second subset of item fields for the two or more of the second set of items.

12. The non-transitory computer-readable medium of claim 11, wherein a first field in the first subset is displayed using a first format, and wherein the first field in the first subset is also included in the second subset and is displayed using a second, different format.

13. The non-transitory computer-readable medium of claim 12, wherein values of one or more formatting parameters for the first field in the first user interface are associated with greater emphasis than values of one or more formatting parameters for the first field in the second user interface.

14. The non-transitory computer-readable medium of claim 12, wherein the set of attributes of the first user includes one or more attribute values associated with an interest in appearance, and wherein the first field is an image that is displayed with a greater size in the first user interface relative to the second user interface.

15. The non-transitory computer-readable medium of claim 12, wherein the set of attributes of the first user includes attribute values associated with an interest in one or more ratings and wherein the first field is a rating element that is displayed with a greater size in the first user interface relative to the second user interface.

16. The non-transitory computer-readable medium of claim 11, wherein the operations further comprise:
generating user group criteria by correlating attributes of users with metrics generated based on user interaction with multiple different user interface design types; and
assigning the first user to a generated user group based on the set of attributes for the first user meeting user group criteria for the generated user group;
wherein the determining the first subset of the set of information is based on the assigned user group.

17. The non-transitory computer-readable medium of claim 11, wherein the set of attributes of the first user includes attribute values associated with an interest in quality.

18. An apparatus, comprising:
one or more processors; and
one or more storage elements having program instructions stored thereon that are executable by the one or more processors to:
maintain, for multiple items of a plurality of items, a respective set of information that includes multiple fields for multiple types of information;
select, by a computing system from the plurality of items, a first set of items based on a single text search query by a first user and a second set of items based on a single text search query by a second user;
ranking the first set of items for display in a first user interface and the second set of items for display in a second user interface;
determine, for two or more of the first set of items, a first subset of item fields based on a set of attributes of the first user, including a communication channel attribute that is based on a current communication channel used by the first user to submit the single text search query and one or more prior communication channels used by the first user, wherein the current communication channel and the one or more prior communication channels provide an interactive medium for displaying information and receiving user input;
determine, for two or more of the second set of items, a second, different subset of item fields based on a set of attributes of the second user;
cause display of, on a device of the first user, the first user interface in response to the single text search query by the first user and prior to receiving additional input from the first user, wherein the first user interface shows the ranked first set of items including, from the set of information, only the first subset of item fields for the two or more of the first set of items; and cause display of, on a device of the second user, the second user interface in response to the single text search query by the second user and prior to receiving additional input from the first user, wherein the second user interface shows the ranked second set of items including, from the set of information, only the second subset of item fields for the two or more of the second set of items.

19. The apparatus of claim 18, wherein a first field in the first subset is also included in the second subset and is displayed using a second, different format, and wherein values of one or more formatting parameters for the first field in the first user interface are associated with greater emphasis than values of one or more formatting parameters for the first field in the second user interface.

20. The apparatus of claim 18, wherein the set of attributes of the first user includes a search term attribute that is based on one or more search terms entered by the first user.

21. The apparatus of claim 18, wherein a first field in the first user interface is displayed differently in the first user interface than the second user interface based on one or more differences in: font style, size, color, location within user interface, opacity, decoration, or resolution.

* * * * *